(12) United States Patent
Matsumoto et al.

(10) Patent No.: US 11,131,201 B2
(45) Date of Patent: Sep. 28, 2021

(54) ROTOR BLADE, ROTOR UNIT, AND ROTATING MACHINE

(71) Applicant: Mitsubishi Hitachi Power Systems, Ltd., Kanagawa (JP)

(72) Inventors: Kazuyuki Matsumoto, Tokyo (JP); Yoshihiro Kuwamura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 147 days.

(21) Appl. No.: 16/488,013

(22) PCT Filed: Feb. 28, 2018

(86) PCT No.: PCT/JP2018/007529
§ 371 (c)(1),
(2) Date: Aug. 22, 2019

(87) PCT Pub. No.: WO2018/159686
PCT Pub. Date: Sep. 7, 2018

(65) Prior Publication Data
US 2021/0131293 A1 May 6, 2021

(30) Foreign Application Priority Data

Feb. 28, 2017 (JP) .............................. JP2017-037753

(51) Int. Cl.
*F01D 5/20* (2006.01)
*F01D 9/02* (2006.01)
(Continued)

(52) U.S. Cl.
CPC ................. *F01D 5/20* (2013.01); *F01D 9/02* (2013.01); *F01D 11/001* (2013.01); *F01D 11/08* (2013.01);
(Continued)

(58) Field of Classification Search
CPC . F01D 11/02; F01D 5/20; F01D 11/08; F01D 11/001; F16J 15/4472; F16J 15/447; F04D 29/161; F05D 2240/55
See application file for complete search history.

(56) References Cited

U.S. PATENT DOCUMENTS 4,662,820 A    5/1987  Sasada et al.
9,388,701 B2 * 7/2016  Kuwamura ............. F01D 11/02
(Continued)

FOREIGN PATENT DOCUMENTS

JP        4-35601      6/1992
JP       10-311205    11/1998
(Continued)

OTHER PUBLICATIONS

International Search Report dated May 15, 2018 in International (PCT) Application No. PCT/JP2018/007529 with English Translation.

(Continued)

*Primary Examiner* — Eldon T Brockman
(74) *Attorney, Agent, or Firm* — Wenderoth, Lind & Ponack, L.L.P.

(57) ABSTRACT

In a rotating machine, a tip shroud of a rotor blade includes a plurality of shroud outer peripheral surfaces which are provided such that radial positions of the shroud outer peripheral surfaces are located stepwise radially outward from an upstream side toward a downstream side, and a step portion which connects adjacent shroud outer peripheral surfaces to each other. The step portion includes an acute angle-forming surface which extends toward the upstream side while extending toward a radially outer side and is connected to an upstream-side end portion of the shroud outer peripheral surface located on the downstream side with an acute angle $\theta 1$.

11 Claims, 9 Drawing Sheets

(51) Int. Cl.
*F01D 11/00* (2006.01)
*F01D 11/08* (2006.01)
*F01D 25/24* (2006.01)

(52) U.S. Cl.
CPC .......... *F01D 25/24* (2013.01); *F05D 2220/30* (2013.01); *F05D 2240/55* (2013.01)

(56) References Cited

U.S. PATENT DOCUMENTS

| | | | |
|---|---|---|---|
| 9,429,022 B2* | 8/2016 | Matsumoto | ........... F01D 11/001 |
| 9,593,587 B2* | 3/2017 | Matsumoto | ............. F01D 11/08 |
| 2011/0070074 A1 | 3/2011 | Schabowski et al. | |
| 2012/0121393 A1 | 5/2012 | Kuwamura et al. | |
| 2012/0288360 A1* | 11/2012 | Kuwamura | .......... F16J 15/4472 |
| | | | 415/173.1 |
| 2013/0272855 A1 | 10/2013 | Kuwamura et al. | |

FOREIGN PATENT DOCUMENTS

| | | |
|---|---|---|
| JP | 2002-228014 | 8/2002 |
| JP | 2011-80452 | 4/2011 |
| JP | 5517910 | 6/2014 |

OTHER PUBLICATIONS

Written Opinion of the International Searching Authority dated May 15, 2018 in International (PCT) Application No. PCT/JP2018/007529 with English translation.

* cited by examiner

ROTOR BLADE, ROTOR UNIT, AND ROTATING MACHINE

TECHNICAL FIELD

The present invention relates a rotor blade, a rotor unit, and a rotating machine. Priority is claimed on Japanese Patent Application No. 2017-037753, filed on Feb. 28, 2017, the content of which is incorporated herein by reference.

BACKGROUND ART

In rotating machines such as steam turbines and gas turbines, a rotating machine is known which includes a casing, a rotating shaft which is rotatably provided inside the casing, a stator vane which is fixedly disposed on an inner peripheral portion of the casing, and a rotor blade which is radially provided on the rotating shaft on a downstream side of the stator vane.

For example, in a case of a steam turbine, pressure energy of steam is converted to velocity energy by a stator vane, and this velocity energy is converted to rotational energy (mechanical energy) by a rotor blade. In addition, the pressure energy may be converted into the velocity energy in the rotor blade, and may be converted into the rotational energy (mechanical energy) by a reaction force from which the steam is ejected.

In this type of rotating machine, a radial gap is formed between a distal end portion of the rotor blade and a casing which surrounds the rotor blade to form a flow path of the steam. In addition, a radial gap is also formed between a distal end portion of the stator vane and a rotating shaft. A working fluid such as steam may pass (leak) through these gaps. The working fluid passing through the gap between the distal end portion of the rotor blade and the casing does not contribute to a rotation of the rotor blade. In addition, the working fluid passing through the gap between the distal end portion of the stator vane and the rotating shaft does not contribute to the conversion of the pressure energy into the velocity energy by the stator vane, and imparts little rotational force to the rotor blade on a downstream side.

Therefore, in order to improve performance of the rotating machine, it is important to decrease an amount of leaked steam passing through the gap.

For example, in PTLs 1 and 2, a configuration is described which includes a step portion which is formed on a distal end portion of a blade of a rotor blade or a stator vane and has a stepped surface, and a seal fin which is provided in a casing, extends toward the step portion, and forms a minute gap between the step portion and the seal fin.

In such a configuration, the working fluid having passed through the minute gap between the step portion and the seal fin collides with the step surface to increase a flow resistance, and thus, a leakage flow passing through the minute gap between the step portion and the seal fin is reduced. In addition, a portion of a main flow of the fluid flowing in a radial direction along the stepped surface of the step portion is separated from the main flow of the fluid at an end edge portion of the stepped surface, and a separation vortex is generated. A contraction flow effect of radially contracting the leakage flow passing through the minute gap between the step portion and the seal fin is exerted by the separation vortex, and thus, the leakage flow passing through the minute gap is reduced.

CITATION LIST

Patent Literature

[PTL 1] Japanese Unexamined Patent Application, First Publication No. 2011-80452
[PTL 2] Japanese Patent No. 5517910

DISCLOSURE OF INVENTION

Technical Problem

However, in the configuration as described above, the end edge portion (edge) of the stepped surface formed in the step portion is a separation vortex which may not stably generate the separation vortex due to a processing error at the time of manufacture, rounding processing and chamfering, wear due to long-term use, or the like. Accordingly, the contraction flow effect due to the separation vortex may be reduced more than expected, the leakage flow passing through the minute gap may increase, and the performance of the rotating machine may be degraded.

The present invention is made in consideration of the above-described circumstances, and an object thereof is to provide a rotor blade, a rotor unit, and a rotating machine capable of suppressing the leakage flow passing through the minute gap and suppressing performance degradation.

Solution to Problem

The present invention adopts the following means for achieving the above-described object.

A first aspect of the present invention provides a rotor blade including: a rotor blade body which is provided to extend radially outward from a rotating shaft of a rotating machine; and a shroud which is provided radially outward of the rotor blade body, in which the shroud includes a plurality of outer peripheral surfaces which are provided to be located stepwise radially outward from an upstream side of a working fluid flowing along a central axis direction of the rotating shaft toward a downstream side thereof, and a step portion which connects a downstream-side end portion of the outer peripheral surface located on the upstream side and an upstream-side end portion of the outer peripheral surface located on the downstream side to each other, and the step portion has an acute angle-forming surface which extends toward the upstream side while extending toward a radially outer side and is connected to the upstream-side end portion of the outer peripheral surface located on the downstream side with an acute angle.

According to this configuration, for example, the step portion of the rotor blade forms a main vortex which guides a working fluid having passed a gap between the seal fin and the outer peripheral surface radially outward, along with the outer peripheral surface on the upstream side of the step portion. In addition, a portion of the working fluid guided radially outward by the acute angle-forming surface of the step portion is separated from a main stream of the working fluid at an intersection between the acute angle-forming surface and the upstream-side end portion of the outer peripheral surface located on the downstream side thereof, and generates a separation vortex. The acute angle-forming surface is connected to the upstream-side end portion of the outer peripheral surface located on the downstream side of the step portion with the acute angle, and thus, it is possible to stably generate the separation vortex.

In a second aspect of the present invention which provides the first aspect, an acute angle distal end portion pointed at an acute angle may be formed at an intersection between the acute angle-forming surface and the upstream-side end portion of the outer peripheral surface located on the downstream side.

According to this configuration, the intersection between the acute angle-forming surface and the upstream-side end portion of the outer peripheral surface on the downstream side is the acute angle distal end portion pointed at an acute angle, and thus, it is possible to stably generate the separation vortex.

In a third aspect of the present invention which provides the first or second aspect, the step portion may include an inner peripheral guide surface radially inward of the acute angle-forming surface, the inner peripheral guide surface extending toward the downstream side while extending toward the radially outer side from the downstream-side end portion of the outer peripheral surface located on the upstream side.

According to this configuration, the working fluid which has passed through the gap between the outer peripheral surface on the upstream side and the seal fin can be effectively guided from the inner peripheral guide surface to the acute angle-forming surface located radially outward thereof.

In a fourth aspect of the present invention which provides the first to third aspects, an angle of the acute angle between the plurality of outer peripheral surfaces and the acute angle-forming surface may increase from the outer peripheral surface on the upstream side toward the outer peripheral surface on the downstream side.

In the shroud including the plurality of outer peripheral surfaces, a density of the working fluid decreases toward the downstream side. Accordingly, for example, in a flow velocity of the working fluid passing through the gap between the outer peripheral surface of the shroud and the seal fin, the flow velocity on the outer peripheral surface on the downstream side is larger than the flow velocity on the outer peripheral surface on the upstream side. Accordingly, in the acute angle between the outer peripheral surface and the acute angle-forming surface, the acute angle on the downstream side is made larger than the acute angle on the upstream side, and thus, it is possible to decrease a diameter of the separation vortex which is generated to be separated from the main stream of the working fluid at the intersection between the acute angle-forming surface and the upstream-side end portion of the outer peripheral surface located on the downstream side. Accordingly, in the plurality of outer peripheral surfaces, for example, it is possible to equalize suppression effects by the separation vortex with respect to the leakage flow of the working fluid passing through the gap of the seal fin.

In a fifth aspect of the present invention, a rotor unit comprises: the rotating shaft; and the rotor blade according to any one of the first to fourth aspects.

According to the fifth aspect, the rotor unit includes the rotor blade, and thus, the acute angle-forming surface is connected to the upstream-side end portion of the outer peripheral surface located on the downstream side of the step portion with an acute angle. Accordingly, it is possible to stably generate the separation vortex separated from the main stream of the working fluid.

A sixth aspect of the present invention provides a rotating machine including: a casing which is disposed radially outward of the shroud and which allows a working fluid to flow through a radially inner side of the casing from an upstream side toward a downstream side along the central axis direction; a plurality of seal fins which are provided at intervals along the central axis direction, each seal fin protruding radially inward from the casing; and a rotor unit according to the fifth aspect.

According to the sixth aspect, the rotating machine includes the rotor unit, and thus, the acute angle-forming surface is connected to the upstream-side end portion of the outer peripheral surface located on the downstream side of the step portion with an acute angle. Accordingly, it is possible to stably generate the separation vortex separated from the main stream of the working fluid.

In a seventh aspect of the present invention which provides the sixth aspect, the acute angle-forming surface may be formed radially outward of a distal end portion of the seal fin facing the outer peripheral surface located on the upstream side.

According to this configuration, the working fluid which has passed through the gap between the outer peripheral surface on the upstream side and the seal fin flows along the acute angle-forming surface, and a flow direction of the working fluid is turned to the upstream side, and as a result, it is possible to prevent the working fluid from being returned to the gap side between the outer peripheral surface on the upstream side and the seal fin. Accordingly, it is possible to effectively guide the working fluid to the intersection between the upstream-side end portion of the outer peripheral surface on the downstream side and the acute angle-forming surface.

In an eighth aspect of the present invention which provides the sixth or seventh aspect, the acute angle-forming surface may radially outward guide a working fluid which has passed through a gap between the outer peripheral surface on the upstream side and the seal fin and may separate a portion of the radially outward guided working fluid from a main stream of the working fluid at an intersection between the acute angle-forming surface and the upstream-side end portion of the outer peripheral surface located on the downstream side to generate a separation vortex.

A ninth aspect of the present invention provides a rotating machine including: a rotating shaft which rotates around a central axis; a rotor blade which includes a rotor blade body provided to extend radially outward from the rotating shaft, and a provided radially outward of the rotor blade body; a casing which is disposed radially outward of the shroud and which allows a working fluid to flow through a radially inner side of the casing from an upstream side toward a downstream side along the central axis direction; a stator vane which includes a stator vane body provided to extend radially inward from the casing and a stator vane shroud provided radially inward of the stator vane body; and a plurality of stator vane seal fins which are provided at intervals along the central axis direction, each stator vane seal fin protruding radially outward from an outer peripheral surface of the rotating shaft, in which the stator vane shroud includes a plurality of shroud inner peripheral surfaces which are provided such that radial positions of the shroud inner peripheral surfaces are located stepwise radially inward from the upstream side toward the downstream side, each shroud inner peripheral surface facing at least one of the plurality of stator vane seal fins on a radially outer side with a space and extending along the central axis, and a stator vane step portion which connects a downstream-side end portion of the shroud inner peripheral surface located on the upstream side and an upstream-side end portion of the shroud inner peripheral surface located on the downstream side to each other, and the stator vane step portion includes a stator vane acute angle-forming surface which extends toward the upstream side while extending toward a radially inner side and is connected to the upstream-side end portion of the shroud inner peripheral surface located on the downstream side with an acute angle.

According to this configuration, the stator vane step portion provided in the stator vane shroud of the stator vane forms a main vortex which guides a working fluid having passed a gap between the stator vane seal fin and the shroud inner peripheral surface radially inward, along with the shroud inner peripheral surface on the upstream side of the stator vane step portion. In addition, a portion of the working fluid guided radially inward by the stator vane acute angle-forming surface of the stator vane step portion is separated from a main stream of the working fluid at an intersection between the stator vane acute angle-forming surface and the upstream-side end portion of the shroud inner peripheral surface located on the downstream side thereof, and generates a separation vortex. The stator vane acute angle-forming surface is connected to the upstream-side end portion of the shroud inner peripheral surface located on the downstream side of the stator vane step portion with the acute angle, and thus, it is possible to stably generate the separation vortex.

In a tenth aspect of the present invention which provides the ninth aspect, the rotating machine may further include a plurality of seal fins which are provided at intervals along the central axis direction, each seal fin protruding radially inward from the casing, in which the shroud of the rotor blade may include a plurality of outer peripheral surfaces which are provided such that radial positions of the outer peripheral surfaces are located stepwise radially outward from the upstream side toward the downstream side, each outer peripheral surface facing at least one of the plurality of seal fins on a radially inner side with a space and extending along the central axis, and a step portion which connects a downstream-side end portion of the outer peripheral surface located on the upstream side and an upstream-side end portion of the outer peripheral surface located on the downstream side to each other, and the step portion may include an acute angle-forming surface which extends toward the upstream side while extending toward a radially outer side and is connected to the upstream-side end portion of the outer peripheral surface located on the downstream side with an acute angle.

An eleventh aspect of the present invention provides a rotating machine including: a rotating shaft which rotates around a central axis; a rotor blade which includes a rotor blade body provided to extend radially outward from the rotating shaft, and a shroud provided radially outward of the rotor blade body; a casing which is disposed radially outward of the shroud and which allows a working fluid to flow through a radially inner side of the casing from an upstream side toward a downstream side along the central axis direction; and a plurality of seal fins which are provided at intervals along the central axis direction, each seal fin protruding radially outward from the shroud, in which the casing includes a plurality of inner peripheral surfaces which are provided such that radial positions of the inner peripheral surfaces are located stepwise radially outward from the upstream side toward the downstream side, each inner peripheral surface facing at least one of the plurality of seal fins on a radially outer side with a space and extending along the central axis, and a step portion which connects a downstream-side end portion of the inner peripheral surface located on the upstream side and an upstream-side end portion of the inner peripheral surface located on the downstream side to each other, and the step portion includes an acute angle-forming surface which extends toward the upstream side while extending toward a radially inner side and is connected to the upstream-side end portion of the inner peripheral surface located on the downstream side with an acute angle.

A twelfth aspect of the present invention provides a rotating machine including: a rotating shaft which rotates around a central axis; a rotor blade which includes a rotor blade body provided to extend radially outward from the rotating shaft, and a shroud provided radially outward of the rotor blade body; a casing which is disposed radially outward of the shroud and which allows a working fluid to flow through a radially inner side of the casing from an upstream side toward a downstream side along the central axis direction; a stator vane which includes a stator vane body provided to extends radially inward from the casing and a stator vane shroud provided radially inward of the stator vane body; and a plurality of stator vane seal fins which are provided at intervals along the central axis direction, each stator vane seal fin protruding radially inward from the stator vane shroud, in which the rotating shaft includes a plurality of outer peripheral surfaces which are provided such that radial positions of the outer peripheral surfaces are located stepwise radially outward from the upstream side toward the downstream side, each outer peripheral surface facing at least one of the plurality of stator vane seal fins on a radially inner side with a space and extending along the central axis, and a step portion which connects a downstream-side end portion of the outer peripheral surface located on the upstream side and an upstream-side end portion of the outer peripheral surface located on the downstream side to each other, and the step portion includes an acute angle-forming surface which extends toward the upstream side while extending toward a radially outer side and is connected to the upstream-side end portion of the outer peripheral surface located on the downstream side with an acute angle.

Advantageous Effects of Invention

According to a rotor blade, a rotor unit, and a rotating machine of the present invention, it is possible to suppress a leakage flow passing through a minute gap and to suppress performance degradation.

BEST MODE FOR CARRYING OUT THE INVENTION

Hereinafter, a steam turbine (rotating machine) according to an embodiment of the present invention will be described based on the drawings. (First Embodiment)

Figure 1:
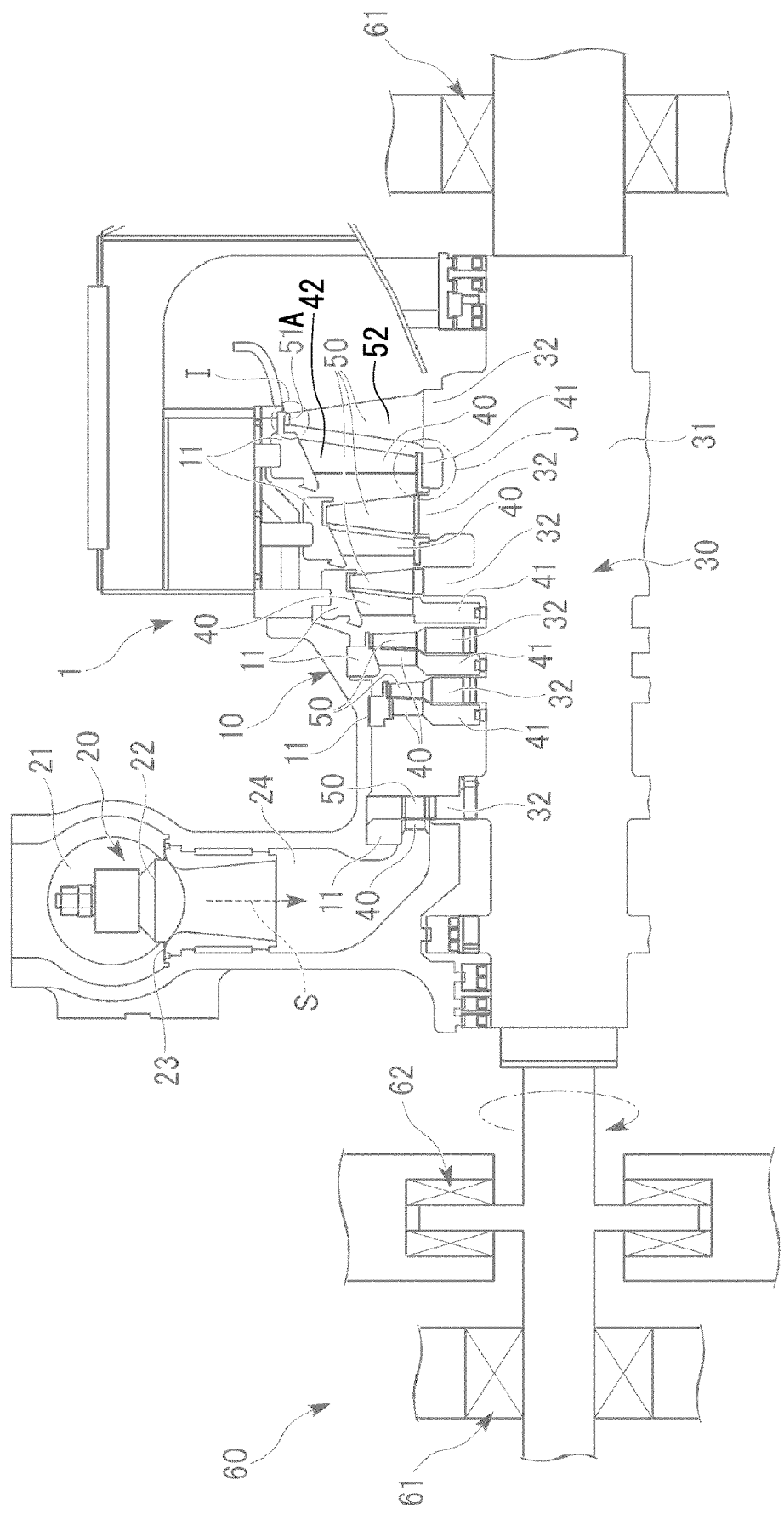
FIG. 1 is a schematic configuration cross-sectional view showing a steam turbine according to an embodiment of the present invention.

FIG. 1 is a schematic configuration cross-sectional view showing a steam turbine according to an embodiment of the present invention.

As shown in FIG. 1, a steam turbine (rotating machine) 1 mainly includes a casing 10, a control valve 20, a rotating shaft 30, stator vanes 40, and rotor blades 50. In addition, the rotor blades 50 are fixed to the rotating shaft 30 via a disk (not shown). For convenience, this one-piece construction is referred to as the rotor unit.

An internal space of the casing 10 is hermetically sealed, and a radially inner side of the casing 10 is a flow path in which steam (working fluid) S flows from an upstream side to a downstream side along a central axis direction. Ring-shaped partition plate outer rings 11 in which the rotating shaft 30 is inserted are firmly fixed to an inner wall surface of the casing 10.

The control valve 20 regulates an amount and a pressure of steam S flowing into the casing 10. A plurality of control valves 20 are attached inside the casing 10. Each control valve 20 includes a control valve chamber 21 into which the steam S flows from a boiler (not shown), a valve body 22 and a valve seat 23. The control valve 20 allows the steam S to flow into the internal space of the casing 10 through the steam chamber 24 by opening the steam flow path when the valve body 22 moves away from the valve seat 23.

The rotating shaft 30 includes a shaft body 31 and a plurality of disks 32 extending from an outer periphery of the shaft body 31 in a radial direction (hereinafter, simply referred to as a radial direction) of the rotating shaft. The rotating shaft 30 is rotatably supported by a bearing portion 60 around a central axis of the rotating shaft 30. The bearing portion 60 includes journal bearing devices 61 and a thrust bearing device 62.

The rotating shaft 30 transmits rotational energy to a machine such as a generator (not shown).

A plurality of stator vanes 40 are radially arranged to surround the rotating shaft 30 to form an annular stator vane group.

Each stator vane 40 has a stator vane body 42 and a hub shroud 41. The stator vane body 42 is provided to extend radially inward from the partition plate outer ring 11 which is fixed to the casing 10. The hub shroud 41 is provided radially inward of the stator vane body 42. The hub shroud 41 has a ring shape, and connects the stator vane bodies 42 of the plurality of stator vanes 40 constituting the annular stator vane group to each other. The rotating shaft 30 is inserted into the casing 10 radially inward of the hub shroud 41, and the hub shroud 41 is disposed with a radial gap from the rotating shaft 30.

Six annular stator vane groups constituted by the plurality of stator vanes 40 are formed at intervals in the axial direction, convert pressure energy of the steam S into velocity energy, and guide the steam S to the rotor blades 50 adjacent to the downstream side.

The rotor blades 50 are provided on the downstream side of each annular stator vane group. A plurality of rotor blades 50 are radially disposed to constitute an annular rotor blade group.

Each rotor blade 50 has a rotor blade body 52 and a tip shroud (shroud) 51A. The rotor blade body 52 is provided so as to extend radially outward from the disk 32 included in the rotating shaft 30. The tip shroud 51A is provided on a radially outer side of the rotor blade body 52.

Figure 2:
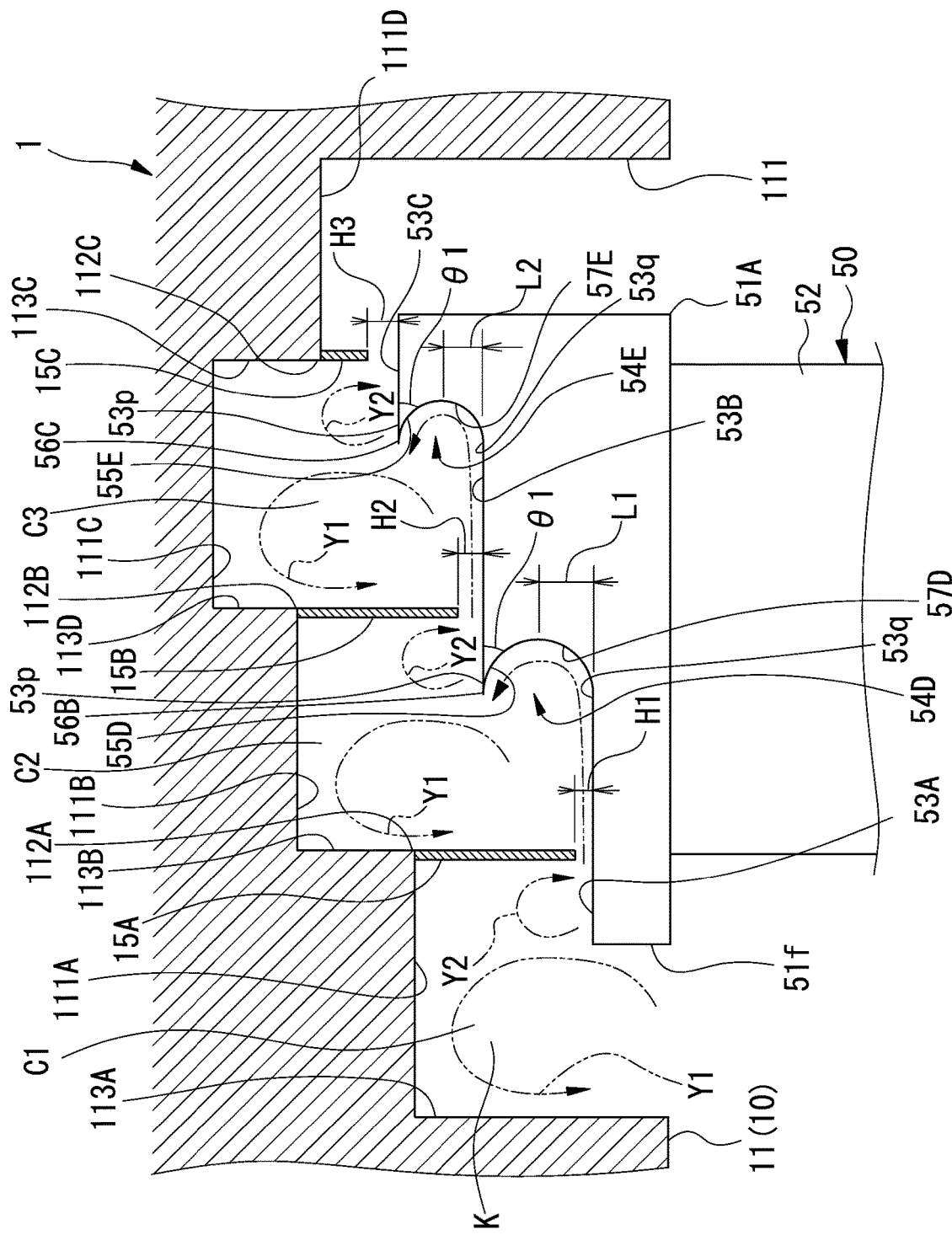
FIG. 2 is a view showing a configuration of a rotor blade in a steam turbine according to a first embodiment of the present invention and an enlarged cross-sectional view showing a main portion I in FIG. 1.

FIG. 2 is an enlarged cross-sectional view showing a main portion I in FIG. 1.

As shown in FIG. 2, the tip shroud 51A, which is a distal end portion of the rotor blade 50, is disposed to face the partition plate outer ring 11 via a gap K in the radial direction of the casing 10.

The tip shroud 51A has shroud outer peripheral surfaces (outer peripheral surfaces) 53A, 53B, and 53C and step portions 54D and 54E on a radially outer side of the tip shroud 51A.

Each of the shroud outer peripheral surfaces 53A, 53B, and 53C is formed such that a central axis of each shroud outer peripheral surface extends to be parallel along the central axis of the rotating shaft 30. The shroud outer peripheral surfaces 53A, 53B, and 53C are provided such that radial positions thereof are provided to be located stepwise radially outward from the shroud outer peripheral surface 53A on an upstream side toward the shroud outer peripheral surface 53C on a downstream side. That is, the shroud outer peripheral surfaces 53A, 53B, and 53C are disposed such that radially outward protruding heights from the rotor blade body 52 gradually increase stepwise from the upstream side (left side in FIG. 2) toward the downstream side (right side in FIG. 2) in the axial direction of the rotating shaft 30.

The step portion 54D connects a downstream-side end portion 53$q$ of the shroud outer peripheral surface 53A located on the upstream side of the step portion 54D and an upstream-side end portion 53$p$ of the shroud outer peripheral surface 53B located on the downstream side of the step portion 54D to each other. The step portion 54E connects a downstream-side end portion 53$q$ of the shroud outer peripheral surface 53B located on the upstream side of the step portion 54E and an upstream-side end portion 53$p$ of the shroud outer peripheral surface 53C located on the downstream side of the step portion 54E to each other.

The step portions 54D and 54E respectively have acute angle-forming surfaces 55D and 55E and inner peripheral guide surfaces 57D and 57E.

Each of the acute angle-forming surfaces 55D and 55E is formed of a curved surface having an arc-shaped cross section extending toward the upstream side while extending toward a radially outer side. Each of the acute angle-forming surfaces 55D and 55E is connected to the upstream-side end portion 53$p$ of each of the shroud outer peripheral surfaces 53B and 53C located on the downstream side with an acute angle $\theta1$. More specifically, the acute angle $\theta1$ is an angle formed by a tangent of each of the acute angle-forming surfaces 55D and 55E passing through the upstream-side end portions 53p and each of the shroud outer peripheral surfaces 53B and 53C.

Accordingly, acute angle distal end portions 56B and 56C pointed at the acute angle θ1 are formed at intersections between the acute angle-forming surfaces 55D and 55E and the upstream-side end portions 53p of the shroud outer peripheral surfaces 53B and 53C located on the downstream sides thereof.

The inner peripheral guide surfaces 57D and 57E are formed radially inward of the acute angle-forming surfaces 55D and 55E. Each of the inner peripheral guide surfaces 57D and 57E is formed of a curved surface having an arc-shaped cross section extending toward the downstream side while extending toward the radially outer side from the downstream-side end portion 53q of each of the shroud outer peripheral surfaces 53A and 53B located on the upstream side.

Here, each of the acute angle-forming surfaces 55D and 55E and each of the inner peripheral guide surfaces 57D and 57E are continuously formed with the same curvature radius as each other.

In addition, the radial intervals L1 and L2 between connections of the acute angle-forming surfaces 55D and 55E and the inner peripheral guide surfaces 57D and 57E and the shroud outer peripheral surfaces 53A and 53B on the upstream side are larger than dimensions of minute gaps H1 and H2 between the shroud outer peripheral surfaces 53A and 53B on the upstream side and seal fins 15A and 15B described later. As a result, the acute angle-forming surfaces 55D and 55E are formed radially outward of the distal end portions of the seal fins 15A and 15B facing the shroud outer peripheral surfaces 53A and 53B located on the upstream side.

In the partition plate outer ring 11, an annular groove 111 is formed at a portion radially facing the tip shroud 51A. The annular groove 111 has three annular recesses 111A, 111B, and 111C which are gradually enlarged in diameter by steps from the upstream side toward the downstream side so as to correspond to the three shroud outer peripheral surfaces 53A, 53B, and 53C of the tip shroud 51A. In addition, the annular groove 111 further has, on the most downstream side, a fourth-stage recess 111D which is smaller in diameter than a third-stage recess 111C.

Here, the seal fin 15A is provided on an end edge portion (edge portion) 112A located at a boundary between the first-stage recess 111A and the second-stage recess 111B. The seal fin 15B is provided on an end edge portion 112B located at a boundary between the second-stage recess 111B and the third-stage recess 111C. A seal fin 15C is provided on an end edge portion 112C located at a boundary between the third-stage recess 111C and the fourth-stage recess 111D. The seal fins 15A, 15B, and 15C respectively extend radially inward toward the tip shroud 51A. In this embodiment, the seal fins 15A, 15B, and 15C are provided in a one-to-one correspondence with the shroud outer peripheral surfaces 53A, 53B, and 53C. Accordingly, each of the shroud outer peripheral surfaces 53A, 53B, and 53C radially faces at least one of the plurality of seal fins 15A, 15B, and 15C.

The seal fins 15A, 15B, and 15C respectively face radially the corresponding shroud outer peripheral surfaces 53A, 53B, and 53C with the minute gaps H1, H2, and H3 therebetween. In consideration of an thermal elongation of the casing 10 or the rotor blade 50, a centrifugal elongation of the rotor blade 50, or the like, each radial dimension of the minute gaps H1, H2 and H3 is set to the minimum within a safe range in which the casing 10 and the rotor blade 50 do not come into contact with each other.

Here, the minute gaps H1, H2, and H3 between the seal fins 15A, 15B, and 15C and the shroud outer peripheral surfaces 53A, 53B, and 53C may all be the same size as each other, or if necessary, it goes without saying that the minute gaps H1, H2, and H3 can be set to be different from each other.

According to this configuration, in a portion between the tip shroud 51A and the partition plate outer ring 11, cavities C1 to C3 are formed between the shroud outer peripheral surfaces 53A, 53B, and 53C and the three recesses 111A, 111B, and 111C of the corresponding annular groove 111.

More specifically, the first cavity C1, which is formed on the most upstream side and corresponds to the first-stage shroud outer peripheral surface 53A, is formed between the seal fin 15A corresponding to the first-stage shroud outer peripheral surface 53A and an upstream-side inner wall surface 113A of the first-stage recess 111A and between the tip shroud 51A and the partition plate outer ring 11.

In addition, the second cavity C2 corresponding to the second-stage shroud outer peripheral surface 53B is formed between the seal fin 15B corresponding to the second-stage shroud outer peripheral surface 53B, an upstream-side inner wall surface 113B of the second-stage recess 111B, and the seal fin 15A provided on the end edge portion 112A, and between the tip shroud 51A and the partition plate outer ring 11.

In addition, the third cavity C3 corresponding to the third-stage shroud outer peripheral surface 53C is formed between the seal fin 15C corresponding to the third-stage shroud outer peripheral surface 53C, a downstream-side inner wall surface 113C of the third-stage recess 111C in which the seal fin 15C is provided, an upstream-side inner wall surface 113D of the third-stage recess 111C, and the shroud outer peripheral surface 53B provided on the end edge portion 112B, and between the tip shroud 51A and the partition plate outer ring 11.

(Operation of Steam Turbine)

Next, an operation of the steam turbine 1 will be described.

First, when the control valve 20 (refer to FIG. 1) is opened, the steam S flows from the boiler (not shown) into the internal space of the casing 10.

The steam S which has flowed into the internal space of the casing 10 sequentially passes through the annular stator vane group and the annular rotor blade group in each stage. In this case, the pressure energy is converted to the velocity energy by the stator vanes 40. Most of the steam S which has passed through the stator vanes 40 flows between the rotor blades 50 which constitute the same stage. The velocity energy of the steam S is converted to the rotational energy by the rotor blades 50 to impart rotation to the rotating shaft 30. Meanwhile, a portion (for example, several percentages) of the steam S has flowed out from the stator vanes 40, and thereafter, flows into the annular groove 111, and thus, becomes so-called leakage steam.

Here, first, the steam S which has flowed into the annular groove 111 flows into the first cavity C1, collides with an upstream-side end surface 51f of the tip shroud 51A, returns to the upstream side, and generates a main vortex Y1 which turns counterclockwise.

In this case, a portion of the flow is separated from the main vortex Y1 (main stream) at a radially outer end portion of the upstream-side end surface 51f, and thus, a separation vortex Y2 is generated so as to rotate in a direction opposite to that of the main vortex Y1, in the present example, clockwise on a paper surface of FIG. 2.

The separation vortex Y2 exerts a contraction flow effect which reduces the leakage flow (leak jet) passing through the minute gap H1 between the seal fin 15A and the shroud outer peripheral surface 53A.

That is, when the separation vortex Y2 is formed, this separation vortex Y2 has a down-flow which directs a velocity vector radially inward on an axial upstream side of the seal fin 15A. This down-flow has an inertial force directed radially inward immediately before the minute gap H1, and thus, the down-flow exerts an effect (contraction flow effect) of contracting a flow passing through the minute gap H1 radially inward, and a leakage flow rate decreases.

Subsequently, the steam S which has passed through the minute gap H1 flows into the second cavity C2, collides with the step portion 54D, and returns to the upstream side to generate the main vortex Y1. Furthermore, a portion of the flow is separated from the main vortex Y1 at the intersection between the acute angle-forming surface 55D of the step portion 54D and the upstream-side end portion 53p of the shroud outer peripheral surface 53B located the downstream side, and thus, the separation vortex Y2 is generated so as to rotate in the direction opposite to that of the main vortex Y1.

In addition, the steam S which has passed through the minute gap H2 flows into the third cavity C3, collides with the step portion 54E, and returns to the upstream side to generate the main vortex Y1. A portion of the flow is separated from the main vortex Y1 at the intersection between the acute angle-forming surface 55E of the step portion 54E and the upstream-side end portion 53p of the shroud outer peripheral surface 53C located the downstream side, and thus, the separation vortex Y2 is generated so as to rotate in the direction opposite to that of the main vortex Y1.

The separation vortex Y2 generated in the second cavity C2 and the third cavity C3 exerts the contraction flow effect, which reduces the leakage flow passing through the minute gaps H2 and H3 between the seal fins 15B and 15C and the shroud outer peripheral surfaces 53B and 53C. That is, when the separation vortex Y2 is formed, this separation vortex Y2 generates the down-flow which directs the velocity vector radially inward on an axial upstream side of a distal end of the seal fin 15A. This down-flow has an inertial force directed radially inward immediately before the minute gaps H2 and H3, and thus, the down-flow exerts the effect (contraction flow effect) of contracting a flow passing through the minute gaps H2 and H3 radially inward, and the leakage flow rate decreases.

Therefore, according to the above-described embodiment, a portion of the steam S which has passed the minute gaps H1 and H2 between the shroud outer peripheral surfaces 53A and 53B and the seal fins 15A and 15B is separated at the intersections between the acute angle-forming surfaces 55D and 55E formed in the step portions 54D and 54E and the upstream-side end portions 53p of the shroud outer peripheral surfaces 53B and 53C located on the downstream sides thereof, and generates the separation vortex Y2. Each of the acute angle-forming surfaces 55D and 55E is connected to each of the upstream-side end portions 53p of the shroud outer peripheral surfaces 53B and 53C located on the downstream side of each of the step portions 54D and 54E with the acute angle θ1, and thus, it is possible to stably generate the separation vortex Y2.

As a result, it is possible to suppress the leakage flow of the steam S passing through the minute gaps H1 and H2 and to suppress the performance degradation of the steam turbine 1.

In addition, the acute angle distal end portions 56B and 56C pointed at the acute angle θ1 are formed at the intersections between the acute angle-forming surfaces 55D and 55E and the upstream-side end portions 53p of the shroud outer peripheral surfaces 53B and 53C located on the downstream sides thereof. Therefore, separation can be promoted, and it is possible to stably generate the separation vortex Y2.

In addition, the acute angle-forming surfaces 55D and 55E are formed radially outward of the distal end portions of the seal fins 15A and 15B facing the shroud outer peripheral surfaces 53A and 53B located on the upstream side. According to this configuration, the steam S which has passed through the minute gaps H1 and H2 between the shroud outer peripheral surfaces 53A and 53B on the upstream side and the seal fins 15A and 15B flows along the acute angle-forming surfaces 55D and 55E, a flow direction of the steam S is turned to the upstream side, and as a result, it is possible to prevent the steam from being returned to the sides of the minute gaps H1 and H2. Accordingly, the steam S can be efficiently guided toward the intersections between the upstream-side end portions 53p of the shroud outer peripheral surfaces 53B and 53C on the downstream side and the acute angle-forming surfaces 55D and 55E, which can contribute to stable generation of the separation vortex Y2.

In addition, the step portions 54D and 54E have the inner peripheral guide surfaces 57D and 57E radially inward of the acute angle-forming surfaces 55D and 55E, and the inner peripheral guide surfaces 57D and 57E extend toward the downstream side as the inner peripheral guide surfaces 57D and 57E while extending toward the radially outer side from the downstream-side end portions 53q of the shroud outer peripheral surfaces 53A and 53B located on the upstream side. According to this configuration, the steam S which has passed through the minute gaps H1 and H2 between the shroud outer peripheral surfaces 53A and 53B on the upstream side and the seal fins 15A and 15B can be effectively guided from the inner peripheral guide surfaces 57D and 57E to the acute angle-forming surfaces 55D and 55E located radially outward thereof.

Modification Example of First Embodiment

In addition, in the first embodiment, in the tip shroud 51A of the rotor blade 50, the inner peripheral guide surfaces 57D and 57E constituted by the curved surfaces having the same curvature radius as those of the acute angle-forming surfaces 55D and 55E are provided radially inward of the acute angle-forming surfaces 55D and 55E of the step portions 54D and 54E. However, the present invention is not limited to this.

Each of the inner peripheral guide surfaces 57D and 57E may be a tapered inclination surface which extends the downstream side while extending toward the radially outer side from the downstream-side end portion 53q of each of the shroud outer peripheral surfaces 53A and 53B located on the upstream side.

Figure 3:
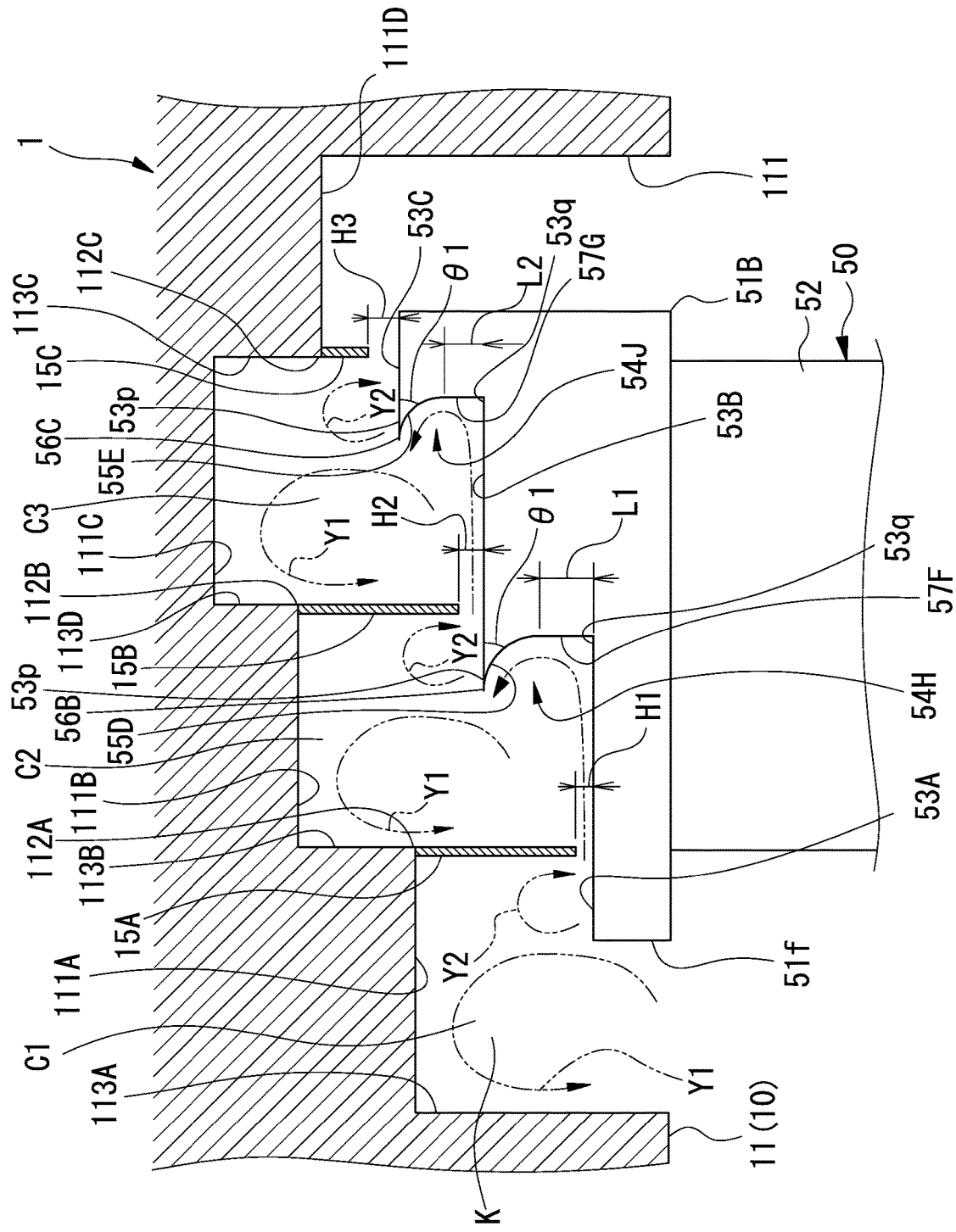
FIG. 3 is an enlarged cross-sectional view showing a configuration of a rotor blade of a steam turbine according to a modification example of the first embodiment of the present invention.

FIG. 3 is an enlarged cross-sectional view showing a configuration of a rotor blade of a steam turbine according to a modification example of the first embodiment of the present invention.

As shown in FIG. 3, in a tip shroud (shroud) 51B of the rotor blade 50, planar inner peripheral guide surfaces 57F and 57G which extend radially outward to be orthogonal to the shroud outer peripheral surfaces 53A and 53B (or the central axis of the rotating shaft 30) from the downstream-side end portions 53q of the shroud outer peripheral surfaces 53A and 53B located on the upstream side may be formed radially inward of the acute angle-forming surfaces 55D and 55E of the step portions 54D and 54E.

Second Embodiment

Next, a second embodiment of the rotating machine according to the present invention will be described. Compared to the first embodiment, in the second embodiment described below, only configurations of step portions 54H and 54J are different, and thus, the same reference signs are assigned to the same portions as those of the first embodiment, and repeated descriptions thereof are omitted.

Figure 4:
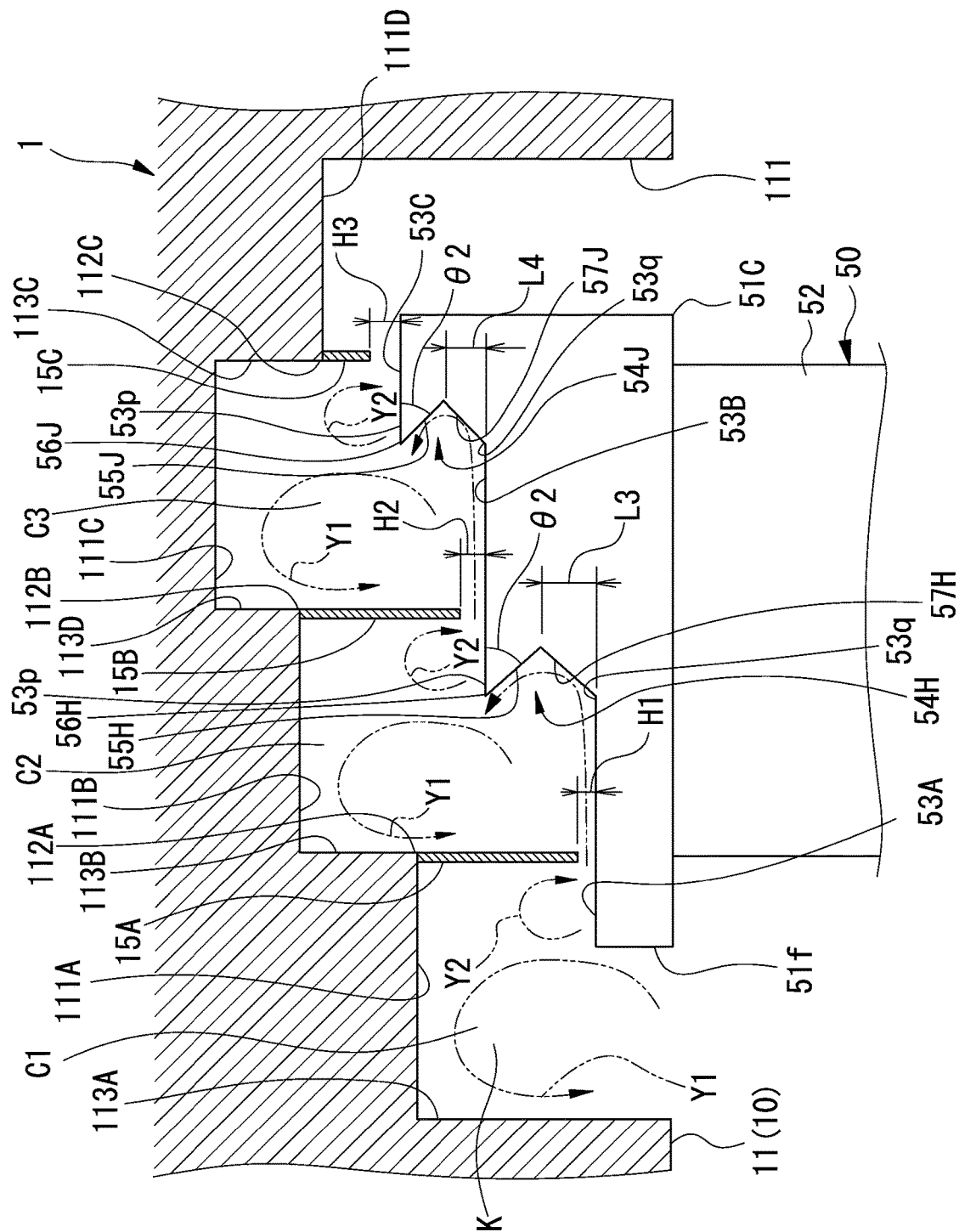
FIG. 4 is an enlarged cross-sectional view showing a configuration of a rotor blade of a steam turbine according to a second embodiment of the present invention.

FIG. 4 is an enlarged cross-sectional view showing a configuration of a rotor blade of a steam turbine according to a second embodiment of the present invention. As shown in FIG. 4, in the steam turbine 1 in this embodiment, a tip shroud (shroud) 51C, which is the distal end portion of the rotor blade 50, has the shroud outer peripheral surfaces 53A, 53B, and 53C and the step portions 54H and 54J on the radially outer side.

The step portion 54H connects the downstream-side end portion 53q of the shroud outer peripheral surface 53A located on the upstream side of the step portion 54H and the upstream-side end portion 53p of the shroud outer peripheral surface 53B located on the downstream side of the step portion 54H to each other. The step portion 54J connects the downstream-side end portion 53q of the shroud outer peripheral surface 53B located on the upstream side of the step portion 54J and the upstream-side end portion 53p of the shroud outer peripheral surface 53C located on the downstream side of the step portion 54J to each other.

The step portions 54H and 54J respectively have acute angle-forming surfaces 55H and 55J and inner peripheral guide surfaces 57H and 57J.

Each of the acute angle-forming surfaces 55H and 55J is formed of a planar inclination surface extending toward the upstream side while extending toward the radially outer side. Each of the acute angle-forming surfaces 55H and 55J is connected to the upstream-side end portion 53p of each of the shroud outer peripheral surfaces 53B and 53C located on the downstream side with an acute angle θ2. Accordingly, acute angle distal end portions 56H and 56J pointed at the acute angle θ2 are formed at intersections between the acute angle-forming surfaces 55H and 55J and the upstream-side end portions 53p of the shroud outer peripheral surfaces 53B and 53C located on the downstream sides thereof.

The inner peripheral guide surfaces 57H and 57J are formed radially inward of the acute angle-forming surfaces 55H and 55J. Each of the inner peripheral guide surfaces 57H and 57J is formed of a planar inclination surface extending toward the downstream side while extending toward the radially outer side from the downstream-side end portion 53q of each of the shroud outer peripheral surfaces 53A and 53B located on the upstream side.

Here, radial intervals L3 and L4 between connections of the acute angle-forming surfaces 55H and 55J and the inner peripheral guide surfaces 57H and 57J and the shroud outer peripheral outer surfaces 53A and 53B on the upstream side are larger than dimensions of the minute gaps H1 and H2 between the shroud outer peripheral surfaces 53A and 53B on the upstream side and seal fins 15A and 15B described later. As a result, the acute angle-forming surfaces 55H and 55J are formed radially outward of the distal end portions of the seal fins 15A and 15B facing the shroud outer peripheral surfaces 53A and 53B located on the upstream side.

Similarly to the first embodiment, according to the above-described embodiment, each of the acute angle-forming surfaces 55H and 55J is connected to each of the upstream-side end portions 53p of the shroud outer peripheral surfaces 53B and 53C located on the downstream side of each of the step portions 54D and 54E with the acute angle θ2, and thus, it is possible to stably generate the separation vortex Y2.

As a result, it is possible to suppress the leakage flow of the steam S passing through the minute gaps H1 and H2 and to suppress the performance degradation of the steam turbine 1.

In addition, the acute angle-forming surfaces 55H and 55J are formed radially outward of the distal end portions of the seal fins 15A and 15B facing the shroud outer peripheral surfaces 53A and 53B located on the upstream side. According to this configuration, the steam S which has passed through the minute gaps H1 and H2 between the shroud outer peripheral surfaces 53A and 53B on the upstream side and the seal fins 15A and 15B flows along the acute angle-forming surfaces 55H and 55J, and as a result, it is possible to prevent the steam from being returned to the sides of the minute gaps H1 and H2. Accordingly, the steam S can be efficiently guided toward the intersections between the upstream-side end portions 53p of the shroud outer peripheral surfaces 53B and 53C on the downstream side and the acute angle-forming surfaces 55H and 55J, which can contribute to stable generation of the separation vortex Y2.

In addition, the step portions 54D and 54E have the inner peripheral guide surfaces 57H and 57J radially inward of the acute angle-forming surfaces 55H and 55J, and the inner peripheral guide surfaces 57H and 57J extend toward the downstream side while extending toward the radially outer side from the downstream-side end portions 53q of the shroud outer peripheral surfaces 53A and 53B located on the upstream side. According to this configuration, the steam S which has passed through the minute gaps H1 and H2 between the shroud outer peripheral surfaces 53A and 53B on the upstream side and the seal fins 15A and 15B can be effectively guided from the inner peripheral guide surfaces 57H and 57J to the acute angle-forming surfaces 55H and 55J located radially outward thereof.

Modification Example of Second Embodiment

Moreover, in the second embodiment, in the tip shroud 51A of the rotor blade 50, the inner peripheral guide surfaces 57H and 57J respectively having the inclination surfaces are provided radially inward of the acute angle-forming surfaces 55H and 55J of the step portions 54H and 54J. However, the present invention is not limited to this.

Figure 5:
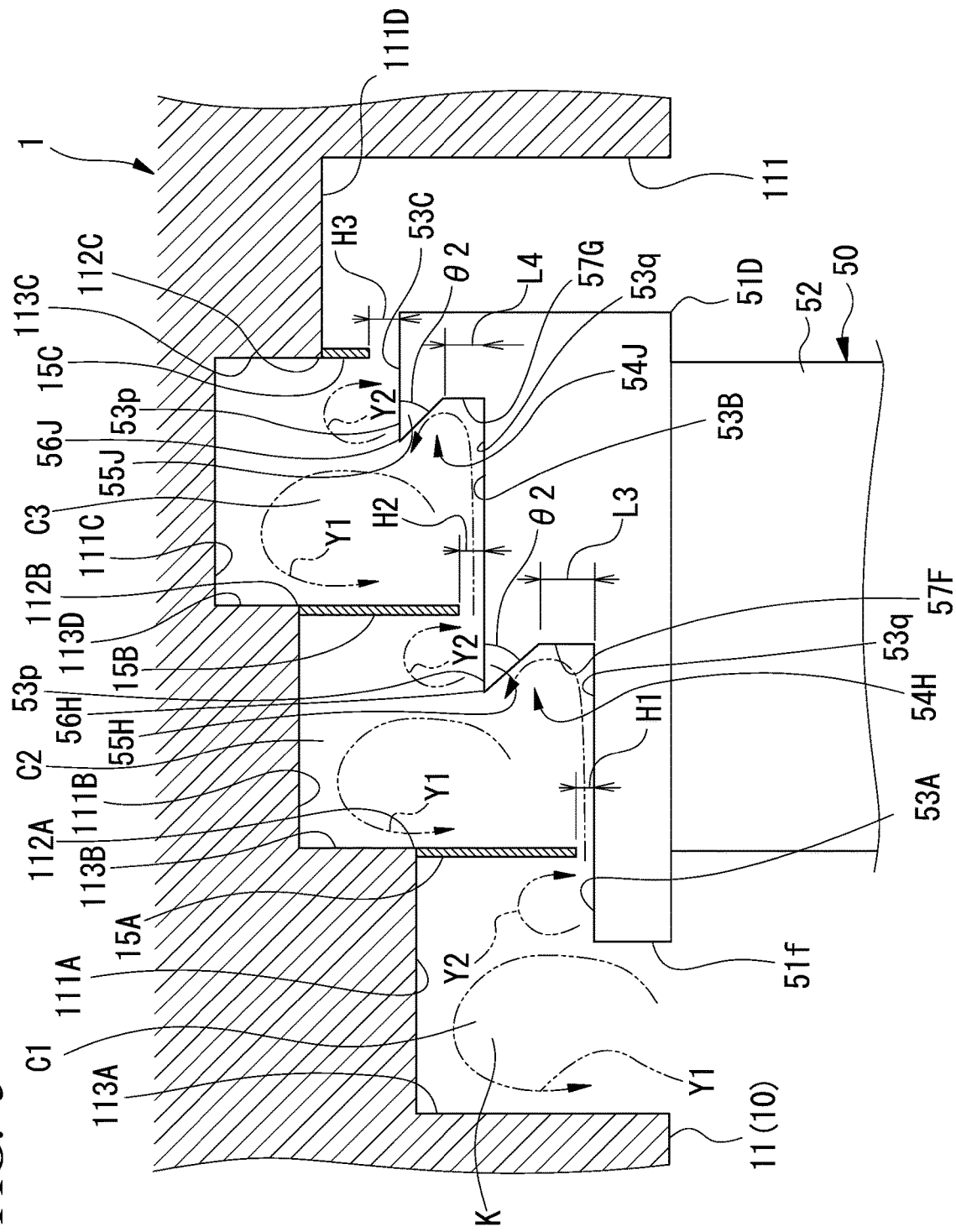
FIG. 5 is an enlarged cross-sectional view showing a configuration of a rotor blade of a steam turbine according to a modification example of the second embodiment of the present invention.

FIG. 5 is an enlarged cross-sectional view showing a configuration of a rotor blade of a steam turbine according to a modification example of the second embodiment of the present invention.

As shown in FIG. 5, in a tip shroud (shroud) 51D of the rotor blade 50, the planar inner peripheral guide surfaces 57F and 57G which extend radially outward to be orthogonal to the shroud outer peripheral surfaces 53A and 53B (or the central axis of the rotating shaft 30) from the downstream-side end portions 53q of the shroud outer peripheral surfaces 53A and 53B located on the upstream side may be formed radially inward of the acute angle-forming surfaces 55H and 55J of the step portions 54H and 54J.

Third Embodiment

Next, a third embodiment of the rotating machine according to the present invention will be described. The third embodiment described below is different from the first and second embodiments in that only configurations of step portions 54K and 54L provided in the tip shroud (shroud) 51E are different, and thus, the same reference signs are assigned to the same portions as those of the first embodiment, and repeated descriptions thereof are omitted.

Figure 6:
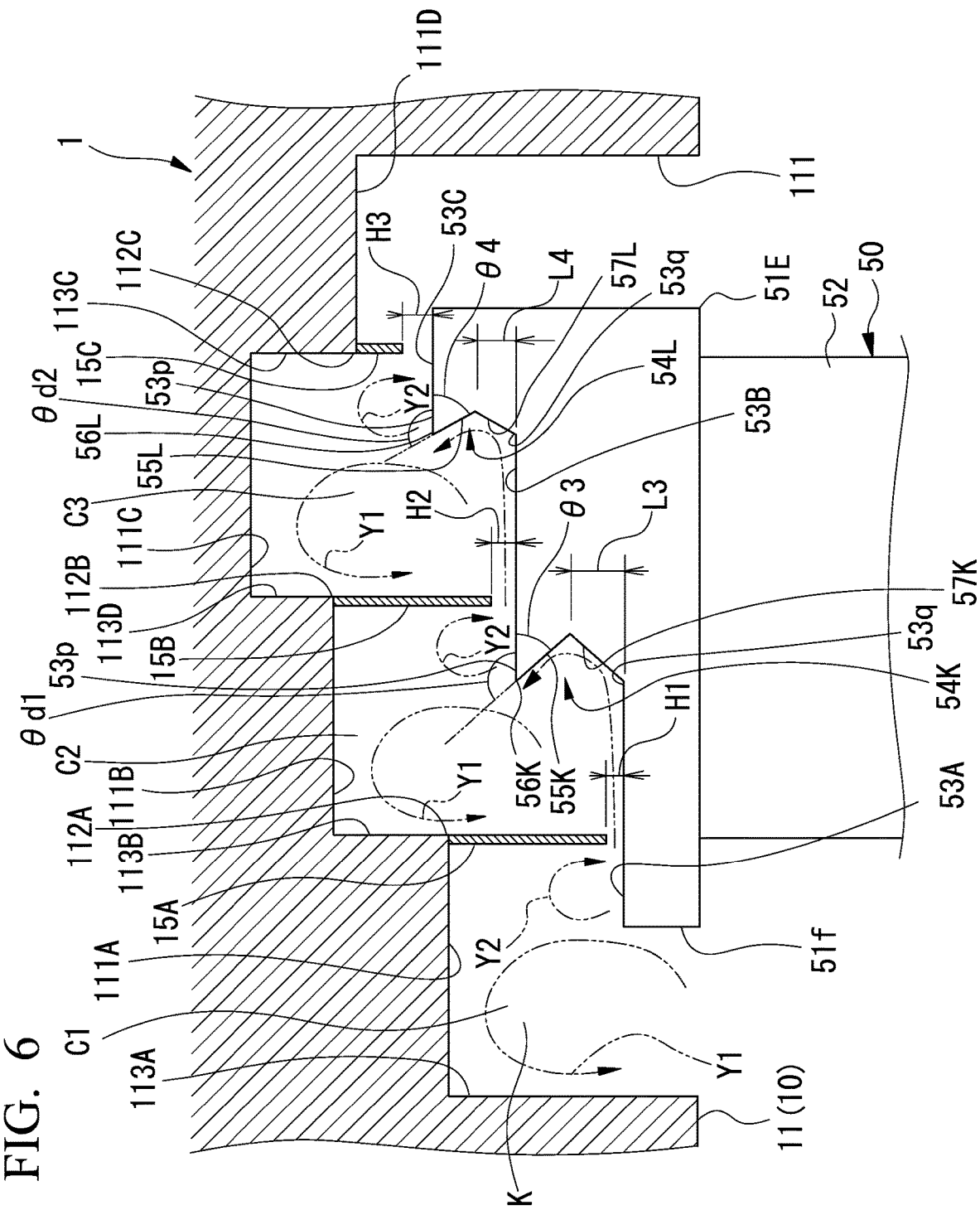
FIG. 6 is an enlarged cross-sectional view showing a configuration of a rotor blade of a steam turbine according to a third embodiment of the present invention.

FIG. 6 is an enlarged cross-sectional view showing a configuration of a rotor blade of a steam turbine according to the third embodiment of the present invention.

As shown in FIG. 6, in the steam turbine 1 in this embodiment, a tip shroud 51E, which is the distal end portion of the rotor blade 50, has the shroud outer peripheral surfaces 53A, 53B, and 53C and the step portions 54K and 54L on the radially outer side.

The step portion 54K connects the downstream-side end portion 53q of the shroud outer peripheral surface 53A located on the upstream side and the upstream-side end portion 53p of the shroud outer peripheral surface 53B located on the downstream side to each other. The step portion 54L connects the downstream-side end portion 53q of the shroud outer peripheral surface 53B located on the upstream side and the upstream-side end portion 53p of the shroud outer peripheral surface 53C located on the downstream side to each other.

The step portions 54K and 54L respectively have acute angle-forming surfaces 55K and 55L and inner peripheral guide surfaces 57K and 57L.

Each of the acute angle-forming surfaces 55K and 55L is formed of a planar inclination surface extending toward the upstream side while extending toward the radially outer side. The acute angle-forming surfaces 55K and 55L are respectively connected to the upstream-side end portions 53p of the shroud outer peripheral surfaces 53B and 53C located on the downstream side with acute angles θ3 and θ4. Accordingly, acute angle distal end portions 56K and 56L pointed at the acute angles θ3 and θ4 are formed at intersections between the acute angle-forming surfaces 55K and 55L and the upstream-side end portions 53p of the shroud outer peripheral surfaces 53B and 53C located on the downstream sides thereof.

Here, in the step portion 54K located in the second cavity C2 and the step portion 54L located in the third cavity C3, the acute angles θ3 and θ4 of the acute angle distal end portions 56K and 56L are different from each other. Accordingly, an outlet angle θd1 of a flow of the steam S which flows out to the upstream side radially outward from the acute angle distal end portion 56K, and an outlet angle θd2 of a flow F2 of the steam S which flows out to the upstream side radially outward from the acute angle distal end portion 56L are different from each other. Here, the outlet angles θd1 and θd2 are angles between the flow of the steam S which flows along the acute angle-forming surfaces 55K and 55L and flows out to the upstream side radially outward from the acute angle distal end portions 56K and 56L, and the shroud outer peripheral surfaces 53B and 53C.

Specifically, a density of the steam S decreases toward the downstream side. Here, in a case where the minute gaps H1 and H2 be the same size as each other, the flow velocity of steam S (leak jet) passing through the minute gaps H1 and H2 increases as going to the downstream side. That is, the flow velocity of the steam S passing through the minute gap H2 between the second-stage shroud outer peripheral surface 53B and the seal fin 15B is larger than the flow velocity of the steam S passing through the minute gap H1 between the first-stage shroud outer peripheral surface 53A and the seal fin 15A.

Accordingly, a radially outward flow of the steam S which collides with the step portion 54L in the third cavity C3 is stronger than a radially outward flow of the steam S which collides with the step portion 54K in the second cavity C2. Therefore, there is a concern that a diameter of the separation vortex Y2 formed on the radially outer side of the third-stage shroud outer peripheral surface 53C may be larger than a diameter of the separation vortex Y2 formed on the radially outer side of the second-stage shroud outer peripheral surface 53B.

Accordingly, in the present embodiment, the outlet angle θd2 of the flow of the steam S flowing out from the acute angle distal end portion 56L of the third-stage step portion 54L is smaller than the outlet angle θd1 of the flow of the steam S flowing out from the acute angle distal end portion 56K of the second-stage step portion 54K. Accordingly, the diameter of the separation vortex Y2 formed on the radially outer side of the second-stage shroud outer peripheral surface 53B and the diameter of the separation vortex Y2 formed on the radially outer side of the third-stage shroud outer peripheral surface 53C are the same as each other. In this way, it is possible to equalize effects of suppressing the leakage flow of the steam S passing through the minute gaps H1 and H2 by the separation vortex Y2.

Moreover, in the third embodiment, the step portions 54K and 54L are formed of the acute angle-forming surfaces 55K and 55L and the inner peripheral guide surfaces 57K and 57L, which are the same inclination surfaces as those of the second embodiment. However, the present invention is limited to this. The same configuration as that of the third embodiment can be also applied to the configurations shown in the first embodiment, the modification example of the first embodiment, the second embodiment, and the modification example of the second embodiment.

Fourth Embodiment

Next, a fourth embodiment of the rotating machine according to the present invention will be described. In the fourth embodiment described below, only a configuration in which the stator vane 40 includes stator vane step portions 44D and 44E having stator vane acute angle-forming surfaces 45D and 45E is different, and thus, the same reference signs are assigned to the same portions as those of the first embodiment, and repeated descriptions thereof are omitted.

Figure 7:
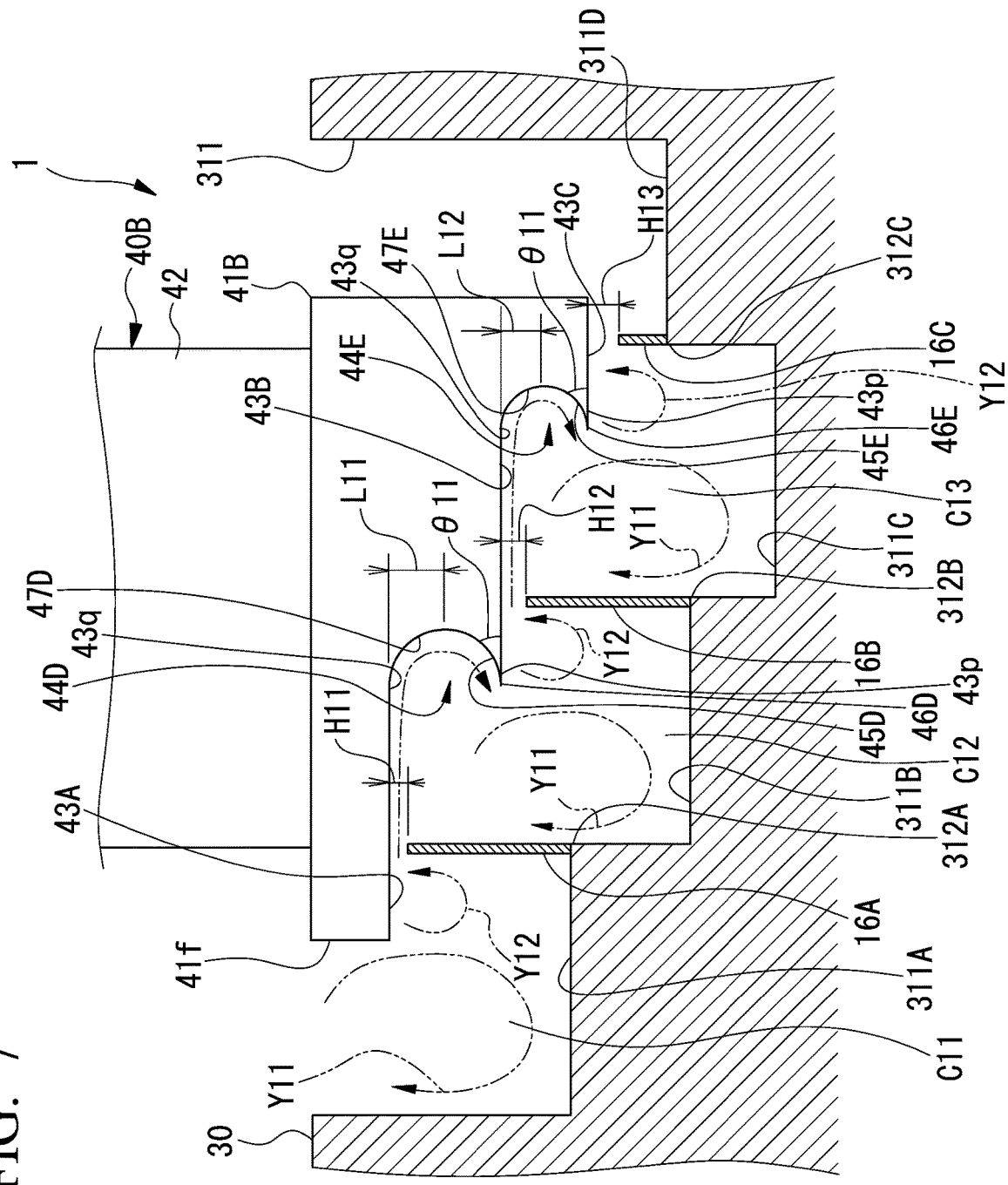
FIG. 7 is an enlarged cross-sectional view showing a configuration of a stator vane in a steam turbine according to a fourth embodiment of the present invention and an enlarged cross-sectional view showing a main portion J in FIG. 1.

FIG. 7 is an enlarged cross-sectional view showing a main portion J in FIG. 1.

As shown in FIG. 7, a stator vane 40B of the steam turbine 1 has a stator vane body 42 and a hub shroud (stator vane shroud) 41B. The hub shroud 41B is provided radially inward of the stator vane body 42. The hub shroud 41B has a ring shape and connects the stator vane bodies 42 of the plurality of stator vanes 40B constituting an annular stator vane group to each other. The rotating shaft 30 is inserted into the casing 10 radially inward of the hub shroud 41B, and the hub shroud 41B is provided with a radial gap with respect to the rotating shaft 30.

The hub shroud 41B has shroud inner peripheral surfaces 43A, 43B, and 43C and stator vane step portions 44D and 44E on a radially inner side of the hub shroud 41B.

Each of the shroud inner peripheral surfaces 43A, 43B, and 43C is formed such that a central axis of each shroud inner peripheral surface extends to be parallel along the central axis of the rotating shaft 30. The shroud inner peripheral surfaces 43A, 43B, and 43C are provided such that radial positions thereof are provided to be located stepwise radially inward from the shroud inner peripheral surface 43A on the upstream side toward the shroud inner peripheral surface 43C on the downstream side. That is, the shroud inner peripheral surfaces 43A, 43B, and 43C are disposed such that radially inward protruding heights from the stator vane body 42 gradually increase stepwise from the upstream side (left side in FIG. 7) toward the downstream side (right side in FIG. 7) in the axial direction of the rotating shaft 30.

The stator vane step portion 44D connects a downstream-side end portion 43q of the shroud inner peripheral surface 43A located on the upstream side of the stator vane step portion 44D and an upstream-side end portion 43p of the shroud inner peripheral surface 43B located on the downstream side of the stator vane step portion 44D to each other. The stator vane step portion 44E connects a downstream-side end portion 43q of the shroud inner peripheral surface 43B located on the upstream side of the stator vane step portion 44E and an upstream-side end portion 43p of the shroud inner peripheral surface 43C located on the downstream stream side of the stator vane step portion 44E to each other.

The stator vane step portions 44D and 44E respectively have stator vane acute angle-forming surfaces 45D and 45E and stator vane inner peripheral guide surfaces 47D and 47E.

Each of the stator vane acute angle-forming surfaces 45D and 45E is formed of a curved surface having an arc-shaped cross section extending toward the upstream side while extending with a radially inner side. Each of the stator vane acute angle-forming surfaces 45D and 45E is connected to the upstream-side end portion 43p of each of the shroud inner peripheral surfaces 43B and 43C located on the downstream side with an acute angle θ11. More specifically, the acute angle θ11 is an angle formed by a tangent of each of the stator vane acute angle-forming surfaces 45D and 45E passing through the upstream-side end portions 43p and each of the shroud outer peripheral surfaces 53B and 53C.

Accordingly, stator vane acute angle distal end portions 46D and 46E pointed at an acute angle θ11 are formed at intersections between the stator vane acute angle-forming surfaces 45D and 45E and the upstream-side end portions 43p of the shroud inner peripheral surfaces 43B and 43C located on the downstream sides thereof.

The stator vane inner peripheral guide surfaces 47D and 47E are formed radially outward of the stator vane acute angle-forming surfaces 45D and 45E. Each of the stator vane inner peripheral guide surfaces 47D and 47E is formed of a curved surface having an arc-shaped cross section extending toward the downstream side while extending toward the radially inner side from the downstream-side end portion 43q of each of the shroud inner peripheral surfaces 43A and 43B located on the upstream side.

Here, radial intervals L11 and L12 between connections of the stator vane acute angle-forming surfaces 45D and 45E and the stator vane inner peripheral guide surfaces 47D and 47E and the shroud inner peripheral surfaces 43A and 43B on the upstream side are larger than minute gaps H11 and H12 between the shroud inner peripheral surfaces 43A and 43B on the upstream side and stator vane seal fins 16A and 16B described later. As a result, the stator vane acute angle-forming surfaces 45D and 45E are formed radially inward of the distal end portions of the stator vane seal fins 16A and 16B facing the shroud inner peripheral surfaces 43A and 43B located on the upstream side.

In the shaft body 31, an annular groove 311 is formed at a portion radially facing the hub shroud 41B. The annular groove 311 has three annular recesses 311A, 311B, and 311C which are gradually reduced in diameter by steps from the upstream side toward the downstream side so as to correspond to the three shroud inner peripheral surfaces 43A, 43B, and 43C of the hub shroud 41B. In addition, the annular groove 311 further has, on the most downstream side, a fourth-stage recess 311D which is smaller in diameter than a third-stage recess 311C.

Here, the stator vane seal fin 16A is provided on an end edge portion (edge portion) 312A located at a boundary between the first-stage recess 311A and the second-stage recess 311B. The stator vane seal fin 16B is provided on an end edge portion 312B located at a boundary between the second-stage recess 311B and the third-stage recess 311C. A stator vane seal fin 16C is provided on an end edge portion 312C located at a boundary between the third-stage recess 311C and the fourth-stage recess 311D. The stator vane seal fins 16A, 16B, and 16C respectively extend radially outward toward the hub shroud 41B. In this embodiment, the stator vane seal fins 16A, 16B, and 16C are provided in a one-to-one correspondence with the shroud inner peripheral surfaces 43A, 43B, and 43C. Accordingly, each of the shroud inner peripheral surfaces 43A, 43B, and 43C radially faces at least one of the plurality of stator vane seal fins 16A, 16B, and 16C.

The stator vane seal fins 16A, 16B, and 16C respectively face radially the corresponding shroud inner peripheral surfaces 43A, 43B, and 43C with the minute gaps H11, H12, and H13 therebetween. In consideration of the thermal elongation of the casing 10 or the rotor blade 50, the centrifugal elongation of the rotor blade 50, or the like, each dimension of the minute gaps H11, H12 and H13 is set to the minimum within a safe range in which the casing 10 and the rotor blade 50 do not come into contact with each other.

Here, the minute gaps H11, H12, and H13 between the stator vane seal fins 16A, 16B, and 16C and the shroud inner peripheral surfaces 43A, 43B, and 43C may all be the same size as each other, or if necessary, it goes without saying that the minute gaps H11, H12, and H13 can be set to be different from each other.

According to this configuration, in a portion between the hub shroud 41B side and the shaft body 31, cavities C11 to C13 are formed between the shroud inner peripheral surfaces 43A, 43B, and 43C and the three recesses 311A, 311B, and 311C of the corresponding annular groove 311.

In this configuration, when the control valve 20 (refer to FIG. 1) of the steam turbine 1 is opened, the steam S flows from the boiler (not shown) into the internal space of the casing 10. A portion (for example, several percentages) of the steam S flows into the annular groove 311, and thus, becomes so-called leakage steam.

Here, first, the steam S which has flowed into the annular groove 311 flows into the first cavity C11, collides with an upstream-side end surface 41f of the hub shroud 41B, and generates a main vortex Y11 which turns to be returned to the upstream side.

In this case, a portion of the flow is separated from the main vortex Y11 (main stream) at a radially inner end portion of the upstream-side end surface 41f, and thus, a separation vortex Y12 is generated so as to rotate in a direction opposite to that of the main vortex Y11.

The separation vortex Y12 exerts a contraction flow effect which reduces the leakage flow passing through the minute gap H11 between the stator vane seal fin 16A and the shroud inner peripheral surface 43A.

That is, when the separation vortex Y12 is formed, this separation vortex Y12 has a down-flow (may be also referred to an up-flow) which directs a velocity vector radially outward on an axial upstream side of a distal end of the stator vane seal fin 16A. This down-flow has an inertial force directed radially outward immediately before the minute gap H11, and thus, the down-flow exerts an effect (contraction flow effect) of contracting a flow passing through the minute gap H11 radially outward, and a leakage flow rate decreases.

Subsequently, the steam S which has passed through the minute gap H11 flows into the second cavity C12, collides with the stator vane step portion 44D, and returns to the upstream side to generate the main vortex Y11. Furthermore, a portion of the flow is separated from the main vortex Y11 at the intersection between the stator vane acute angle-forming surface 45D of the stator vane step portion 44D and the upstream-side end portion 43p of the shroud inner peripheral surface 43B located the downstream side, and thus, the separation vortex Y12 is generated so as to rotate in the direction opposite to that of the main vortex Y11.

In addition, the steam S which has passed through the minute gap H12 flows into the third cavity C13, collides with the stator vane step portion 44E, and returns to the upstream side to generate the main vortex Y11. A portion of the flow is separated from the main vortex Y11 at the intersection between the stator vane acute angle-forming surface 45E of the stator vane step portion 44E and the upstream-side end portion 43p of the shroud inner peripheral surface 43C located the downstream side, and thus, the separation vortex Y12 is generated so as to rotate in the direction opposite to that of the main vortex Y11.

The separation vortex Y12 generated in the second cavity C12 and the third cavity C13 exerts the contraction flow effect, which reduces the leakage flow passing through minute gaps H12 and H13 between the stator vane seal fins 16B and 16C and the shroud inner peripheral surfaces 43B and 43C. That is, when the separation vortex Y12 is formed, this separation vortex Y12 generates the down-flow which directs the velocity vector radially outward on axial upstream sides of distal ends of the stator vane seal fins 16B and 16C. This down-flow has an inertial force directed radially outward immediately before the minute gaps H12 and H13, and thus, the down-flow exerts the effect (contraction flow effect) of contracting a flow passing through the minute gaps H12 and H13 radially outward, and the leakage flow rate decreases.

Therefore, according to the above-described embodiment, the stator vane step portions 44D and 44E provided in the hub shroud 41 of the stator vane 40 include the stator vane acute angle-forming surfaces 45D and 45E. Each of the stator vane acute angle-forming surfaces 45D and 45E is connected to each of the upstream-side end portions 43p of the shroud inner peripheral surfaces 43A, 43B, and 43C located on the downstream side of each of the stator vane step portions 44D and 44E with the acute angle, and thus, the separation can be promoted, and it is possible to stably generate the separation vortex Y12. As a result, it is possible to suppress the leakage flow passing through the minute gaps H12 and H13 and to suppress the performance degradation of the steam turbine 1.

Moreover, the present invention is not limited to the above-described embodiments, and also includes embodiments obtained by applying various modifications to the above-described embodiments within a scope which does not depart from the gist of the present invention. That is, specific shapes, configurations, or the like described in the embodiments are merely examples, and can be changed appropriately.

For example, in the above-described embodiments and modification examples, the present invention is applied to the rotor blade 50 or the stator vane 40 of the final stage. However, the present invention may be applied to the rotor blades 50 and the stator vanes 40 of other stages.

Figure 8:
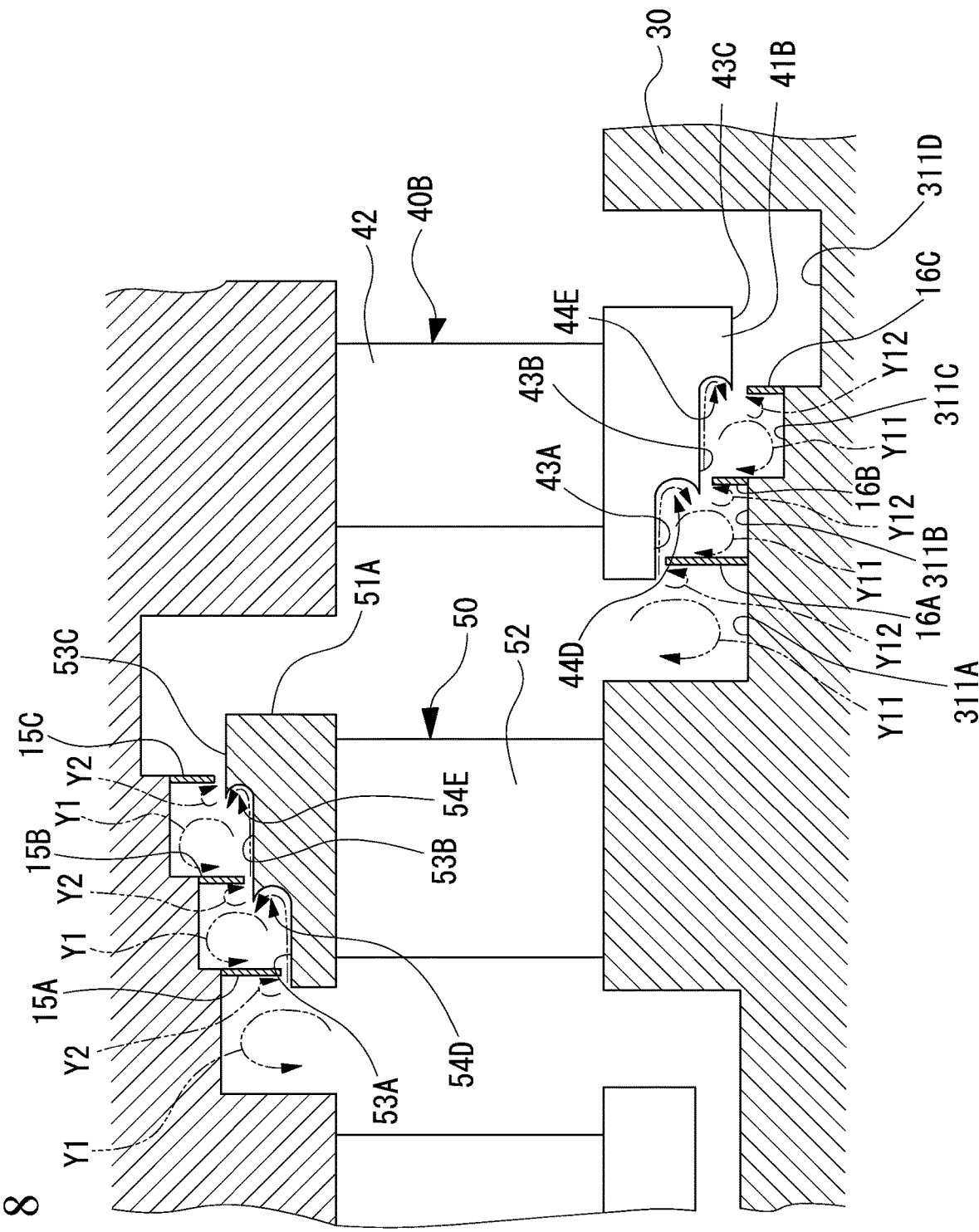
FIG. 8 is an enlarged sectional view showing a configuration of a stator vane of a steam turbine according to a first modification example of each embodiment of the present invention.

For example, it is possible to adopt a configuration as shown in FIG. 8.

That is, similarly to the first embodiment, in the tip shroud 51A of the rotor blade 50, the shroud outer peripheral surfaces 53A, 53B, and 53C are disposed such that radially outward protruding heights from the rotor blade body 52 gradually increase stepwise from the upstream side (left side in FIG. 8) toward the downstream side (right side in FIG. 8) in the axial direction of the rotating shaft 30.

In addition, the hub shroud 41B of the stator vane 40B, the shroud inner peripheral surfaces 43A, 43B, and 43C are disposed such that radially inward protruding heights from the stator vane body 42 gradually decrease stepwise from the upstream side (left side in FIG. 8) toward the downstream side (right side in FIG. 8) in the axial direction of the rotating shaft 30.

Moreover, the third-stage recess 311C is located radially inward of the fourth-stage recess 311D. In addition, a bottom surface of the first-stage recess 311A is disposed at the same radial position as that of a bottom surface of the second-stage recess 311B.

Figure 9:
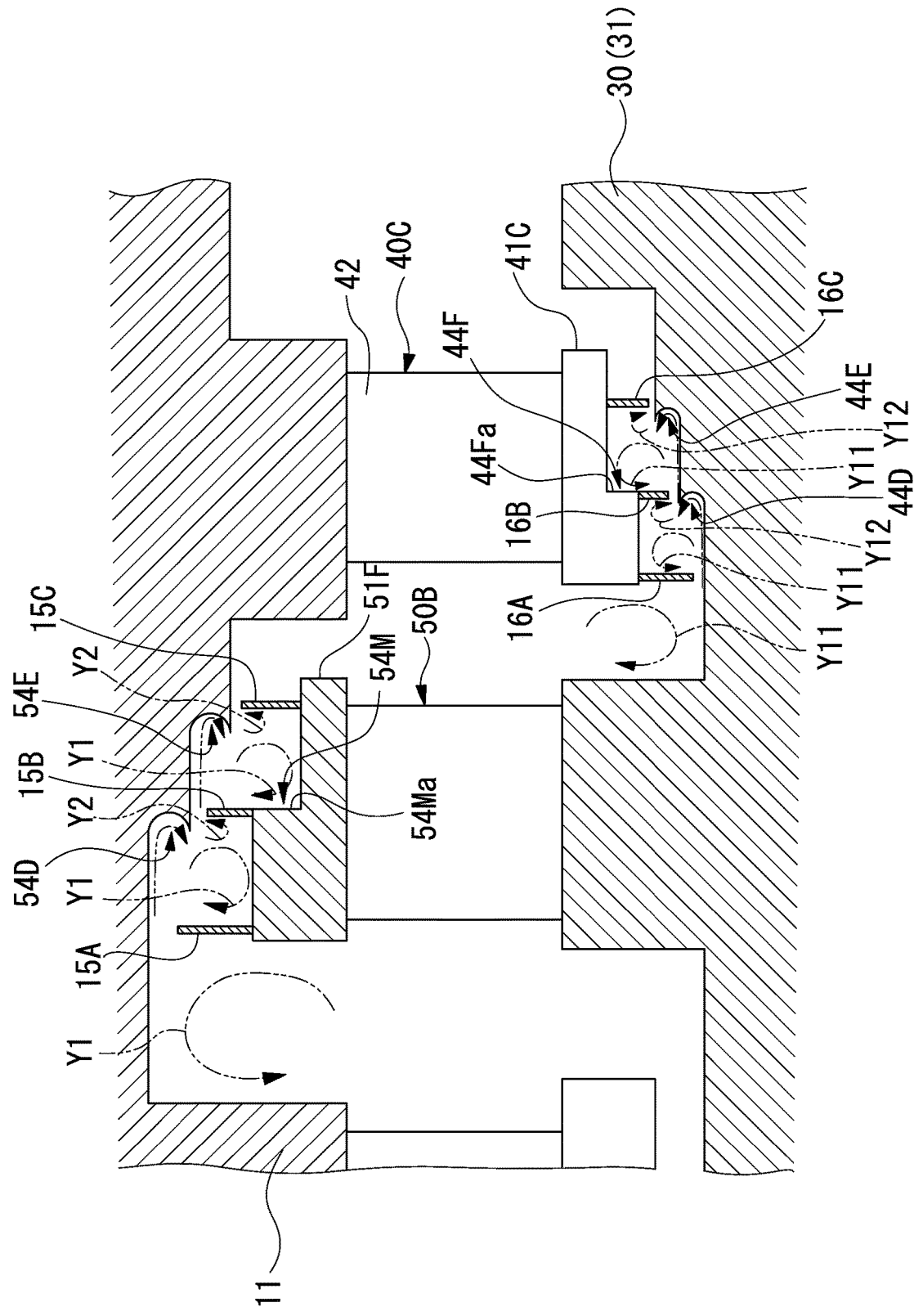
FIG. 9 is an enlarged sectional view showing a configuration of a stator vane of a steam turbine according to a second modification example of each embodiment of the present invention.

In addition, a configuration shown in FIG. 9 can be adopted.

That is, the tip shroud 51F of the rotor blade 50 has a step portion 54M. According to the step portion 54M, a rotor blade 50B is disposed such that a radially outward protruding height from the rotor blade body 52 gradually decreases stepwise from the upstream side (left side in FIG. 9) toward the downstream side (right side in FIG. 9) in the axial direction of the rotating shaft 30. In addition, the seal fin 15A is provided at a position of an upstream-side end portion of the tip shroud 51F. Moreover, the seal fin 15B is provided at a position of a guide surface 54Ma which forms the step portion 54M and faces the downstream side. Further, the seal fin 15C is provided at a position of a downstream-side end portion of the tip shroud 51F. The seal fins 15A, 15B, and 15C protrude radially outward from the tip shroud 51F.

In addition, the partition plate outer ring 11 has the step portions 54D and 54E at a position radially facing the tip shroud 51F. According to the step portions 54D and 54E, a radial position of the partition plate outer ring 11 is gradually located stepwise radially inward from the upstream side toward the downstream side in the axial direction of the rotating shaft 30.

Moreover, in FIG. 9, a hub shroud 41C of a stator vane 40C has a stator vane step portion 44F. According to the stator vane step portion 44F, the stator vane 40C is disposed such that a radially inward protruding height from the stator vane body 42 gradually decreases stepwise from the upstream side toward the downstream side in the axial direction of the rotating shaft 30. In addition, the seal fin 16A is provided at a position of an upstream-side end portion of the hub shroud 41C. Moreover, the seal fin 16B is provided at a position of a guide surface 44Fa which forms the stator vane step portion 44F and faces the downstream side. Further, the seal fin 16C is provided at a position of a downstream-side end portion of the hub shroud 41C. The seal fins 16A, 16B, and 16C protrude radially inward from the hub shroud 41C.

In addition, the shaft body 31 has the step portions 44D and 44E at a position radially facing the hub shroud 41C. According to the step portions 44D and 44E, the radial position of the outer peripheral surface of the shaft body 31 is gradually located stepwise radially inward from the upstream side toward the downstream side in the axial direction of the rotating shaft 30.

Moreover, in the above embodiments, the present invention is applied to a condensing type steam turbine. However, the present invention may be applied to other types of steam turbine, for example, turbines such as a two-stage extraction turbine, an extraction turbine, and an air mixing turbine.

Furthermore, although the present invention is applied to the steam turbine 1 in the above-described embodiments, the present invention can be applied to a gas turbine, and further, the present invention can be applied to all turbines having rotor blades.

INDUSTRIAL APPLICABILITY

According to a rotor blade, a rotor unit, and a rotating machine of the present invention, it is possible to suppress a leakage flow passing through a minute gap and to suppress performance degradation.

REFERENCE SIGNS LIST

1: steam turbine (rotating machine)
10: casing
11: partition plate outer ring
15A, 15B, 15C: seal fin
16A, 16B, 16C: stator vane seal fin
20: control valve
21: control valve chamber
22: valve body
23: valve seat
24: steam chamber
30: rotating shaft
31: shaft body
32: disk
40, 40B, 40C: stator vane
41, 41B, 41C: hub shroud (stator vane shroud)
41f: upstream-side end surface
42: stator vane body
43A, 43B, 43C: shroud inner peripheral surface
43p: upstream-side end portion
43q: downstream-side end portion
44D, 44E, 44F: stator vane step portion
44Fa: guide surface
45D, 45E: stator vane acute angle-forming surface
46: stator vane acute angle distal end portion
47D, 47E: stator vane inner peripheral guide surface
50, 50B: rotor blade
51A to 51F: tip shroud (shroud)
51f: upstream-side end surface
52: rotor blade body
53A, 53B, 53C: shroud outer peripheral surface (outer peripheral surface)
53p: upstream-side end portion
53q: downstream-side end portion
54D, 54E, 54H, 54J, 54K, 54L, 54M: step portion
54Ma: guide surface
55D, 55E, 55H, 55J, 55K, 55L: acute angle-forming surface
56B, 56C, 56H, 56J, 56K, 56L: acute angle distal end portion
57D, 57E, 57F, 57G, 57H, 57J, 57K, 57L: inner peripheral guide surface
60: bearing portion
61: journal bearing device
62: thrust bearing device
111: annular groove
111A, 111B, 111C, 111D: recess
112A, 112B, 112C: end edge portion
113A, 113B, 113C, 113D: inner wall surface
311: annular groove
311A, 311B, 311C, 311D: recess
312B, 312C: end edge portion
C1, C2, C3, C11, C12, C13: cavity
H1, H2, H3, H11, H12, H13: minute gap
K: gap
S: steam
Y1, Y11 is main vortex
Y12, Y2: separation vortex
$\theta 1, \theta 2, \theta 3, \theta 4, \theta 11$: acute angle
$\theta d1, \theta d2$: outlet angle

The invention claimed is:

1. A rotor blade, comprising:
a rotor blade body which is provided to extend radially outward from a rotating shaft of a rotating machine; and
a shroud which is provided radially outward of the rotor blade body,
wherein the shroud includes
a plurality of outer peripheral surfaces which are provided to be located stepwise radially outward from an upstream side of a working fluid flowing along a central axis direction of the rotating shaft toward a downstream side thereof, and
a step portion which connects a downstream-side end portion of the outer peripheral surface located on the upstream side and an upstream-side end portion of the outer peripheral surface located on the downstream side to each other,
wherein the step portion has an acute angle-forming surface which extends toward the upstream side while extending toward a radially outer side and is connected to the upstream-side end portion of the outer peripheral surface located on the downstream side with an acute angle, and
wherein an angle of the acute angle between the plurality of outer peripheral surfaces and the acute angle-forming surface increases from the outer peripheral surface on the upstream side toward the outer peripheral surface on the downstream side.

2. The rotor blade according to claim 1,
wherein an acute angle distal end portion pointed at an acute angle is formed at an intersection between the acute angle-forming surface and the upstream-side end portion of the outer peripheral surface located on the downstream side.

3. The rotor blade according to claim 1,
wherein the step portion includes an inner peripheral guide surface radially inward of the acute angle-forming surface, the inner peripheral guide surface extending toward the downstream side while extending toward the radially outer side from the downstream-side end portion of the outer peripheral surface located on the upstream side.

4. A rotor unit, comprising:
the rotating shaft; and
the rotor blade according to claim 1.

5. A rotating machine, comprising:
a casing which is disposed radially outward of the shroud and which allows a working fluid to flow through a radially inner side of the casing from an upstream side toward a downstream side along the central axis direction;

a plurality of seal fins which are provided at intervals along the central axis direction, each seal fin protruding radially inward from the casing; and
the rotor unit according to claim 4.

6. The rotating machine according to claim 5,
wherein the plurality of outer peripheral surfaces radially faces the plurality of seal fins, respectively, and
wherein the acute angle-forming surface is formed radially outward of a distal end portion of one of the plurality of seal fins facing a corresponding one of the plurality of outer peripheral surfaces that is located on the upstream side of the acute angle-forming surface.

7. The rotating machine according to claim 5,
wherein the plurality of outer peripheral surfaces radially faces the plurality of seal fins, respectively, and
wherein the acute angle-forming surface radially outward guides a working fluid which has passed through a gap between one of the plurality of outer peripheral surfaces that is located on the upstream side of the acute angle-forming surface and a corresponding one of the plurality of seal fins which faces the one of the plurality of outer peripheral surfaces on the upstream side of the acute angle-forming surface, and separates a portion of the radially outward guided working fluid from a main stream of the working fluid at an intersection between the acute angle-forming surface and the upstream-side end portion of the outer peripheral surface located on the downstream side to generate a separation vortex.

8. A rotating machine, comprising:
a rotating shaft which rotates around a central axis;
a rotor blade which includes a rotor blade body provided to extend radially outward from the rotating shaft, and a shroud provided radially outward of the rotor blade body;
a casing which is disposed radially outward of the shroud and which allows a working fluid to flow through a radially inner side of the casing from an upstream side toward a downstream side along the central axis direction;
a stator vane which includes a stator vane body provided to extend radially inward from the casing and a stator vane shroud provided radially inward of the stator vane body; and
a plurality of stator vane seal fins which are provided at intervals along the central axis direction, each stator vane seal fin protruding radially outward from an outer peripheral surface of the rotating shaft,
wherein the stator vane shroud includes
a plurality of shroud inner peripheral surfaces which are provided such that radial positions of the shroud inner peripheral surfaces are located stepwise radially inward from the upstream side toward the downstream side, each shroud inner peripheral surface facing at least one of the plurality of stator vane seal fins on a radially outer side with a space and extending along the central axis, and
a stator vane step portion which connects a downstream-side end portion of the shroud inner peripheral surface located on the upstream side and an upstream-side end portion of the shroud inner peripheral surface located on the downstream side to each other,
wherein the stator vane step portion includes a stator vane acute angle-forming surface which extends toward the upstream side while extending toward a radially inner side and is connected to the upstream-side end portion of the shroud inner peripheral surface located on the downstream side with an acute angle, and
wherein an angle of the acute angle between the plurality of shroud inner peripheral surfaces and the stator vane acute angle-forming surface increases from the shroud inner peripheral surface on the upstream side toward the shroud inner peripheral surface on the downstream side.

9. The rotating machine according to claim 8, further comprising:
a plurality of seal fins which are provided at intervals along the central axis direction, each seal fin protruding radially inward from the casing,
wherein the shroud of the rotor blade includes
a plurality of outer peripheral surfaces which are provided such that radial positions of the outer peripheral surfaces are located stepwise radially outward from the upstream side toward the downstream side, each outer peripheral surface facing at least one of the plurality of seal fins on a radially inner side with a space and extending along the central axis, and
a step portion which connects a downstream-side end portion of the outer peripheral surface located on the upstream side and an upstream-side end portion of the outer peripheral surface located on the downstream side to each other, and
wherein the step portion includes an acute angle-forming surface which extends toward the upstream side while extending toward a radially outer side and is connected to the upstream-side end portion of the outer peripheral surface located on the downstream side with an acute angle.

10. A rotating machine, comprising:
a rotating shaft which rotates around a central axis;
a rotor blade which includes a rotor blade body provided to extend radially outward from the rotating shaft, and a shroud provided radially outward of the rotor blade body;
a casing which is disposed radially outward of the shroud and which allows a working fluid to flow through a radially inner side of the casing from an upstream side toward a downstream side along the central axis direction; and
a plurality of seal fins which are provided at intervals along the central axis direction, each seal fin protruding radially outward from the shroud,
wherein the casing includes
a plurality of inner peripheral surfaces which are provided such that radial positions of the inner peripheral surfaces are located stepwise radially inward from the upstream side toward the downstream side, each inner peripheral surface facing a radially outer side of at least one of the plurality of seal fins with a space and extending along the central axis, and
a step portion which connects a downstream-side end portion of the inner peripheral surface located on the upstream side and an upstream-side end portion of the inner peripheral surface located on the downstream side to each other,
wherein the step portion includes an acute angle-forming surface which extends toward the upstream side while extending toward a radially inner side and is connected to the upstream-side end portion of the inner peripheral surface located on the downstream side with an acute angle, and
wherein an angle of the acute angle between the plurality of inner peripheral surfaces and the acute angle-forming surface increases from the inner peripheral surface on the upstream side toward the inner peripheral surface on the downstream side.

11. A rotating machine, comprising:
a rotating shaft which rotates around a central axis;
a rotor blade which includes a rotor blade body provided to extend radially outward from the rotating shaft, and a shroud provided radially outward of the rotor blade body;
a casing which is disposed radially outward of the shroud and which allows a working fluid to flow through a radially inner side of the casing from an upstream side toward a downstream side along the central axis direction;
a stator vane which includes a stator vane body provided to extend radially inward from the casing and a stator vane shroud provided radially inward of the stator vane body; and
a plurality of stator vane seal fins which are provided at intervals along the central axis direction, each stator vane seal fin protruding radially inward from the stator vane shroud,
wherein the rotating shaft includes
a plurality of outer peripheral surfaces which are provided such that radial positions of the outer peripheral surfaces are located stepwise radially outward from the upstream side toward the downstream side, each outer peripheral surface facing at least one of the plurality of stator vane seal fins on a radially inner side with a space and extending along the central axis, and
a step portion which connects a downstream-side end portion of the outer peripheral surface located on the upstream side and an upstream-side end portion of the outer peripheral surface located on the downstream side to each other,
wherein the step portion includes an acute angle-forming surface which extends toward the upstream side while extending toward a radially outer side and is connected to the upstream-side end portion of the outer peripheral surface located on the downstream side with an acute angle, and
wherein an angle of the acute angle between the plurality of outer peripheral surfaces and the acute angle-forming surface increases from the outer peripheral surface on the upstream side toward the outer peripheral surface on the downstream side.

* * * * *